(12) United States Patent
Zhu et al.

(10) Patent No.: US 11,219,161 B2
(45) Date of Patent: Jan. 11, 2022

(54) HAND-PROPELLED POWER TOOL

(71) Applicant: Nanjing Chervon Industry Co., Ltd., Nanjing (CN)

(72) Inventors: Guangqian Zhu, Nanjing (CN); Na Guo, Nanjing (CN); Toshinari Yamaoka, Nanjing (CN); Fangjie Nie, Nanjing (CN); Qi Zhang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 16/922,118

(22) Filed: Jul. 7, 2020

(65) Prior Publication Data

US 2021/0016817 A1 Jan. 21, 2021

(30) Foreign Application Priority Data

Jul. 16, 2019 (CN) .......................... 201910641003.6
Apr. 8, 2020 (CN) .......................... 202010268480.5

(51) Int. Cl.
*A01D 34/68* (2006.01)
*A01D 34/82* (2006.01)
*B62B 5/06* (2006.01)
*A01D 101/00* (2006.01)

(52) U.S. Cl.
CPC .......... *A01D 34/824* (2013.01); *A01D 34/68* (2013.01); *B62B 5/064* (2013.01); *A01D 2101/00* (2013.01)

(58) Field of Classification Search
CPC .. A01D 34/824; A01D 34/68; A01D 2101/00; B62B 5/064
See application file for complete search history.

(56) References Cited

U.S. PATENT DOCUMENTS

| 2013/0111866 A1 | 5/2013 | Schmalz |
| 2015/0101301 A1* | 4/2015 | Yamaoka ............... A01D 34/67 56/10.8 |

FOREIGN PATENT DOCUMENTS

| CN | 102523817 A | * | 7/2012 | ............... B25G 3/38 |
| CN | 205546535 U | * | 9/2016 | ........... A01D 34/824 |
| CN | 205546535 U | | 9/2016 | |
| CN | 206525151 U | * | 9/2017 | |
| DE | 202007008802 U1 | * | 10/2007 | ............... B62B 5/06 |
| DE | 202017100776 U1 | * | 2/2017 | ........... A01D 34/824 |
| DE | 202017100776 U1 | | 2/2017 | |

(Continued)

*Primary Examiner* — James A Shriver, II
*Assistant Examiner* — Michael T. Walsh
(74) *Attorney, Agent, or Firm* — Greenberg Traurig, LLP

(57) ABSTRACT

A hand-propelled power tool includes a main body, a handle assembly, a fixing plate assembly, and a walking assembly connected to the main body. The handle assembly includes a first connecting rod and a second connecting rod. The first connecting rod is provided with a first adjusting assembly. The second connecting rod is provided with a second adjusting assembly. The first adjusting assembly and the second adjusting assembly form a linkage by a connecting member. The first adjusting assembly and the second adjusting assembly include a first movement state and a second movement state. When in the first movement state, the connecting member can transmit a force between the first adjusting assembly and the second adjusting assembly. When in the second movement state, the connecting member does not transmit a force between the first adjusting assembly and the second adjusting assembly.

19 Claims, 18 Drawing Sheets

(56) References Cited

FOREIGN PATENT DOCUMENTS

EP 1752036 A1 * 2/2007 ........... A01D 34/824
EP 2684439 A1 1/2014

* cited by examiner

HAND-PROPELLED POWER TOOL

RELATED APPLICATION INFORMATION

This application claims the benefit under 35 U.S.C. § 119(a) of Chinese Patent Application No. CN 201910641003.6, filed on Jul. 16, 2019, and Chinese Patent Application No. CN 202010268480.5, filed on Apr. 8, 2020, each of which is incorporated by reference in its entirety herein.

BACKGROUND

The present disclosure relates to a hand-propelled power tool.

As a garden tool, the hand-propelled power tool can be operated by a user to do trimming of the garden. In terms of hand-propelled tools, they include a lawn mower, a snow blower, etc. Here, as far as the lawnmower is concerned, it includes a handle assembly connected to the main body of the lawnmower. The handle assembly is generally composed of two connecting rods, and the relative angle between the handle assembly and the main body needs to be adjusted in a timely manner. When an operator operates the handle assembly, typically he needs to release or lock the handle assembly. In the related art, however, due to vibration and strain during the process of assembly, operation, etc., the reliability of the locked or released state between the handle assembly and the main body is reduced, even making locking or releasing impossible. Thus, it is a technical problem to be urgently solved by those skilled in the art to provide a hand-propelled power tool that can effectively increase the reliability of the locking or releasing relationship between the handle assembly and the main body.

SUMMARY

In one example, a hand-propelled power tool includes a main body; a handle assembly comprising a gripping portion, a first connecting rod and a second connecting rod, wherein the gripping portion includes a first end and a second end, a first connecting rod connects the first end of the gripping portion and the main body, and the second connecting rod connects the second end of the gripping portion and the main body; a first adjusting assembly configured to lock or release the rotation of the first connecting rod relative to the main body, wherein at least a portion of the first adjusting assembly is mounted at the first connecting rod; a second adjusting assembly configured to lock or release the rotation of the second connecting rod relative to the main body, wherein at least a portion of the second adjusting assembly is mounted at the second connecting rod; an operating member movable to a first position and a second position, wherein the operating member drives the first adjusting assembly to release the rotation of the first connecting rod relative to the main body when the operating member moves from the first position to the second position; a transmission assembly configured to connect the first adjusting assembly and the second adjusting assembly; wherein the transmission assembly drives the second adjusting assembly to release the rotation of the second connecting rod relative to the main body when the first adjusting assembly releases the rotation of the first connecting rod relative to the main body.

In one example, in condition that the operating member moves from the first position to the second position, the transmission assembly is operative to transmit a force between the first adjusting assembly and the second adjusting assembly; and in condition that the operating member moves from the second position to the first position, the transmission assembly does not transmit a force between the first adjusting assembly and the second adjusting assembly.

In one example, in condition that the operating member moves from the first position to the second position, the transmission assembly is operative to transmit a motion between the first adjusting assembly and the second adjusting assembly; and in condition that the operating member moves from the second position to the first position, the transmission assembly does not transmit motion between the first adjusting assembly and the second adjusting assembly.

In one example, in condition that the first adjusting assembly moves to release the rotation of the first connecting rod relative to the main body, the transmission assembly transmit a motion from the first adjusting assembly to the second adjusting assembly; and in condition that the first adjusting assembly moves to lock the rotation of the first connecting rod relative to the main body, the transmission assembly does not transmit a motion from the first adjusting assembly to the second adjusting assembly.

In one example, the first adjusting assembly includes: a first locking pin configured to connect the first connecting rod and the main body to lock the rotation of the first connecting rod; wherein the second adjusting assembly includes: a second locking pin configured to connect the second connecting rod and the main body to lock the rotation of the second connecting rod; and wherein the main body includes: a first fixing plate provided with a first locking hole for the first locking pin to insert; and a second fixing plate provide with a second locking hole for the second locking pin to insert.

In one example, the first adjusting assembly includes: a first locking member configured to connect with the first connecting rod and the main body to lock the rotation of the first connecting rod; a first elastic member configured to drive the first locking member to reset to lock the rotation of the first connecting rod.

In one example, the first elastic member biases the operating member to move to the first position.

In one example, the second adjusting assembly includes: a second locking member configured to connect with the second connecting rod and the main body to lock the rotation of the second connecting rod; a second elastic member configured to drive the second locking member to reset to lock the rotation of the second connecting rod.

In one example, the first adjusting assembly further includes: a first linkage member connecting the first locking member and the transmission assembly; wherein the first linkage member is rotatably connected to the first connecting rod, and the first linkage member connects the operating member and the first locking member.

In one example, the first connecting rod is capable of rotating relative to the main body about a first rotational axis, and the first linkage member is capable of rotating relative to the first connecting rod about a second axis perpendicular to the first rotational axis.

In one example, the second adjusting assembly further includes: a second linkage member connecting the second locking member and the transmission assembly; wherein the second linkage member is rotatably connected to the second connecting rod.

In one example, the first adjusting assembly includes: a first locking member configured to connect with the first connecting rod and the main body to lock the rotation of the first connecting rod; a first linkage member connecting the first locking member and the transmission assembly; wherein the first linkage member connects the operating member and the first locking member.

In one example, the second adjusting assembly includes: a second locking member configured to connect with the second connecting rod and the main body to lock the rotation of the second connecting rod; a second linkage member connecting the second locking member and the transmission assembly.

In one example, the first connecting rod is capable of rotating relative to the main body about a first rotational axis, and the first linkage member is capable of rotating relative to the first connecting rod about a second axis perpendicular to the first rotational axis, the operating member is disposed on a side of the second axis, and the first locking member and the transmission assembly are dispose disposed on another side of the second axis.

In one example, the handle assembly further includes a pivot shaft connecting the first connecting rod and the second connecting rod, and the pivot shaft is connected to the main body.

In one example, a hand-propelled power tool includes: a main body; a handle assembly comprising a gripping portion, a first connecting rod and a second connecting rod, wherein the gripping portion includes a first end and a second end, a first connecting rod connects the first end of the gripping portion and the main body, and the second connecting rod connects the second end of the gripping portion and the main body; a first adjusting assembly configured to lock or release the rotation of the first connecting rod relative to the main body, wherein at least a portion of the first adjusting assembly is mounted at the first connecting rod; a second adjusting assembly configured to lock or release the rotation of the second connecting rod relative to the main body, wherein at least a portion of the second adjusting assembly is mounted at the second connecting rod; and an operating member movable to a first position and a second position; wherein the first adjusting assembly releases the rotation of the first connecting rod relative to the main body and the second adjusting assembly releases the rotation of the second connecting rod relative to the main body when the operating member is operated to move to the second position.

In one example, a hand-propelled power tool includes: a main body; a handle assembly comprising a gripping portion, a first connecting rod and a second connecting rod, wherein the gripping portion includes a first end and a second end, a first connecting rod connects the first end of the gripping portion and the main body, and the second connecting rod connects the second end of the gripping portion and the main body; a first adjusting assembly configured to lock or release the rotation of the first connecting rod relative to the main body, wherein at least a portion of the first adjusting assembly is mounted at the first connecting rod; a second adjusting assembly configured to lock or release the rotation of the second connecting rod relative to the main body, wherein at least a portion of the second adjusting assembly is mounted at the second connecting rod; and an operating member movable to a first position and a second position; wherein the operating member drives the first adjusting assembly to release the rotation of the first connecting rod relative to the main body and drives the second adjusting assembly to release the rotation of the second connecting rod relative to the main body when the operating member is operated to move to the second position.

In one example, the hand-propelled power tool further includes: a first transmission assembly configured to transmit a power between the operating member and the first adjusting assembly; and a second transmission assembly configured to transmit a power between the operating member and the second adjusting assembly.

In one example, the first adjusting assembly includes: a first locking pin configured to connect the first connecting rod and the main body to lock the rotation of the first connecting rod; and wherein the second adjusting assembly includes: a second locking pin configured to connect the second connecting rod and the main body to lock the rotation of the second connecting rod.

In one example, the first adjusting assembly includes: a first elastic member configured to drive first locking member to reset to lock the rotation of the first connecting rod; and wherein the second adjusting assembly includes: a second elastic member configured to drive second locking member to reset to lock the rotation of the second connecting rod.

In one example, the main body includes: a first plate provided with a first locking hole for the first locking pin to insert; and a second plate provide with a second locking hole for the second locking pin to insert.

DETAILED DESCRIPTION

Figure 1:
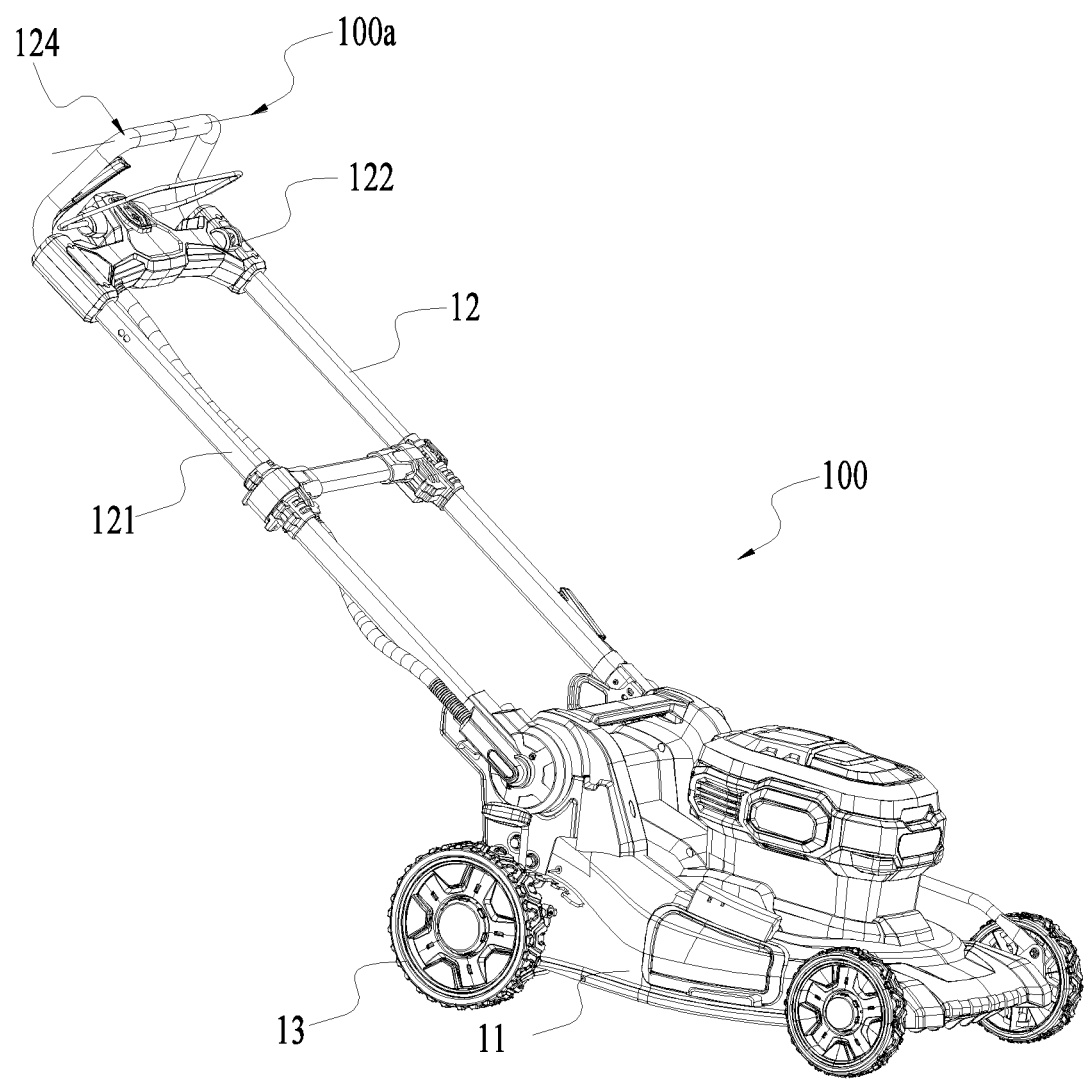
FIG. 1 is a perspective view of a hand-propelled power tool.
Figure 2:
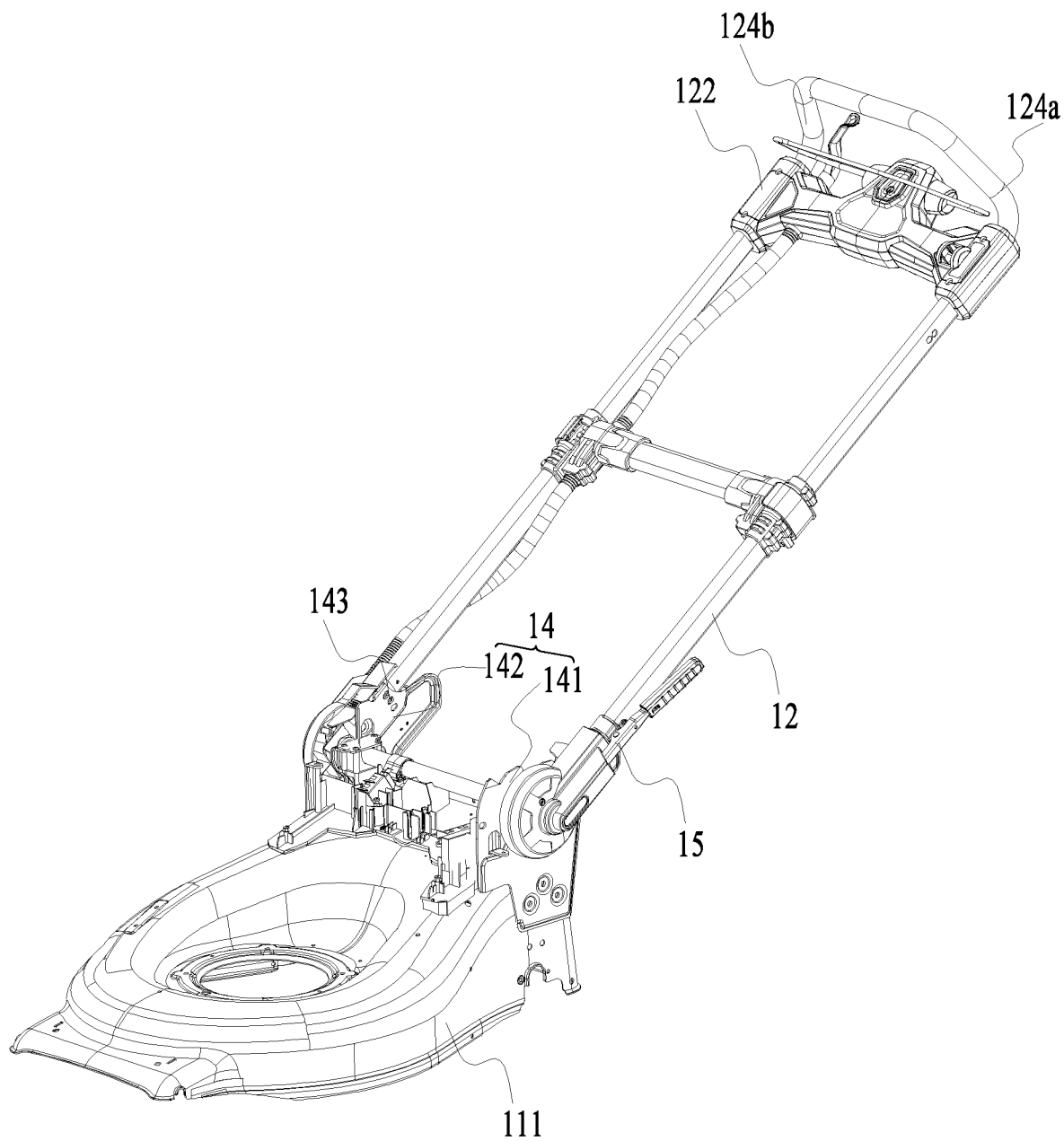
FIG. 2 is a perspective view of the handle assembly of the hand-propelled power tool connected to the main casing in FIG. 1.
Figure 3:
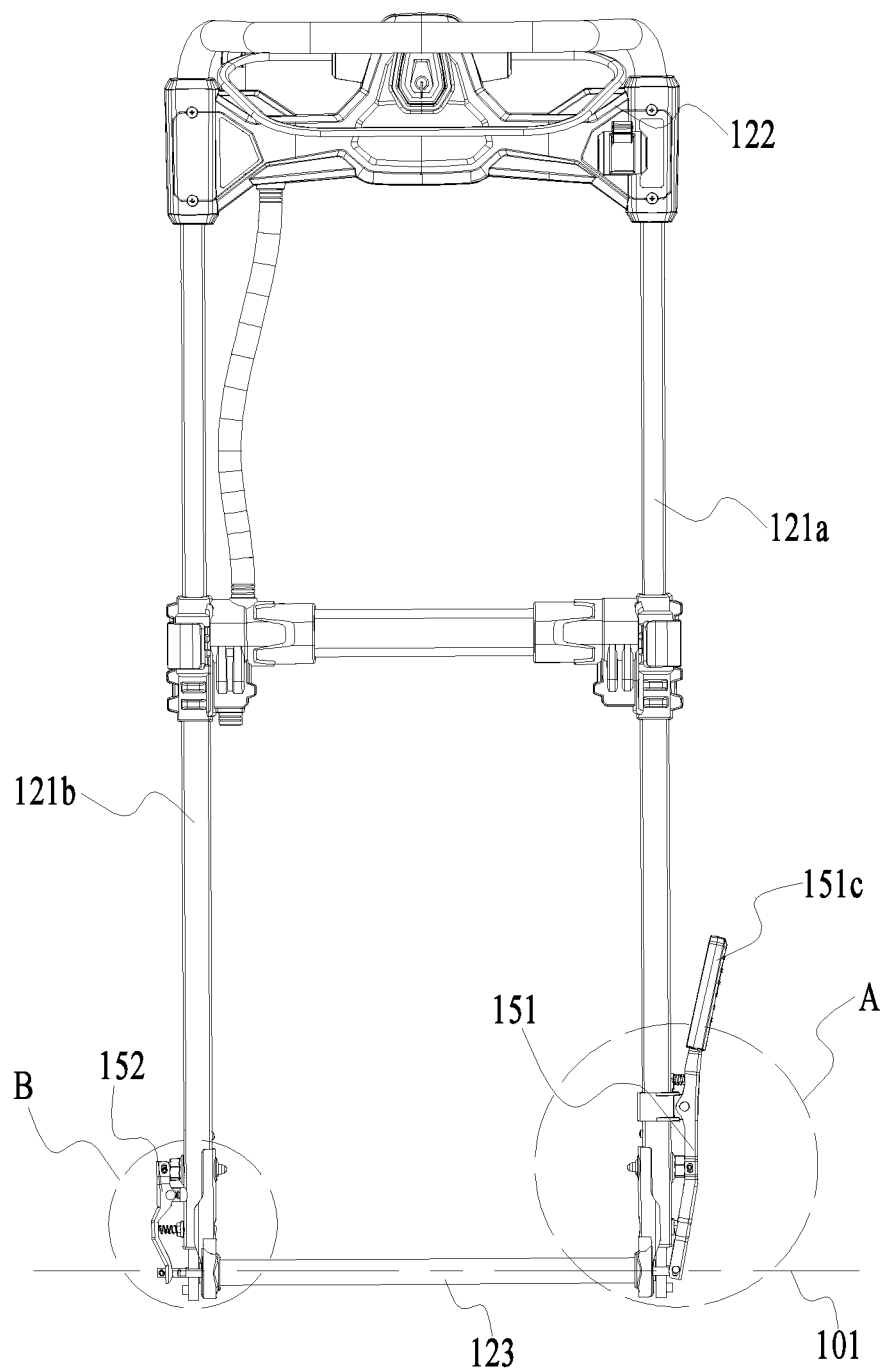
FIG. 3 is a perspective view of the handle assembly of the hand-propelled power tool of FIG. 1.
Figure 4:
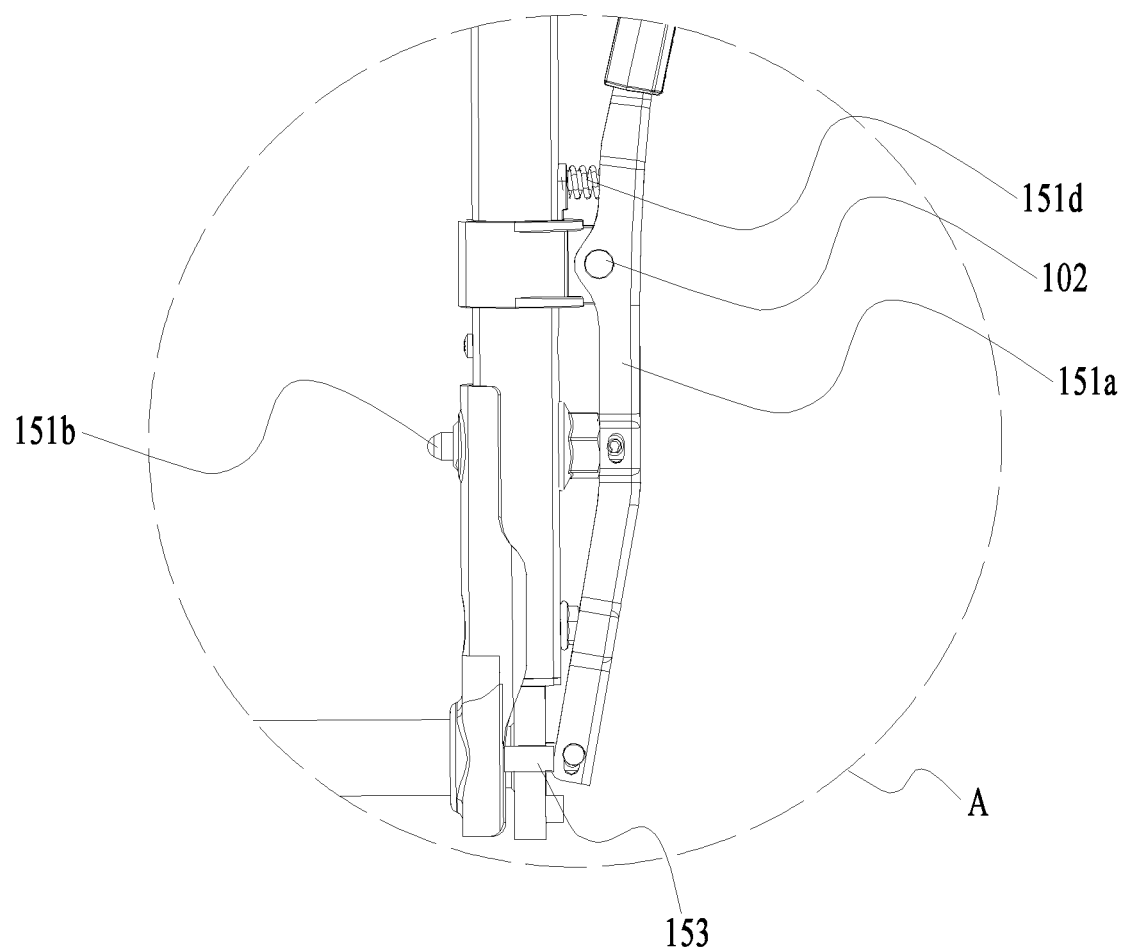
FIG. 4 is a partial enlarged view of portion A of the hand-propelled power tool shown in FIG. 3.
Figure 5:
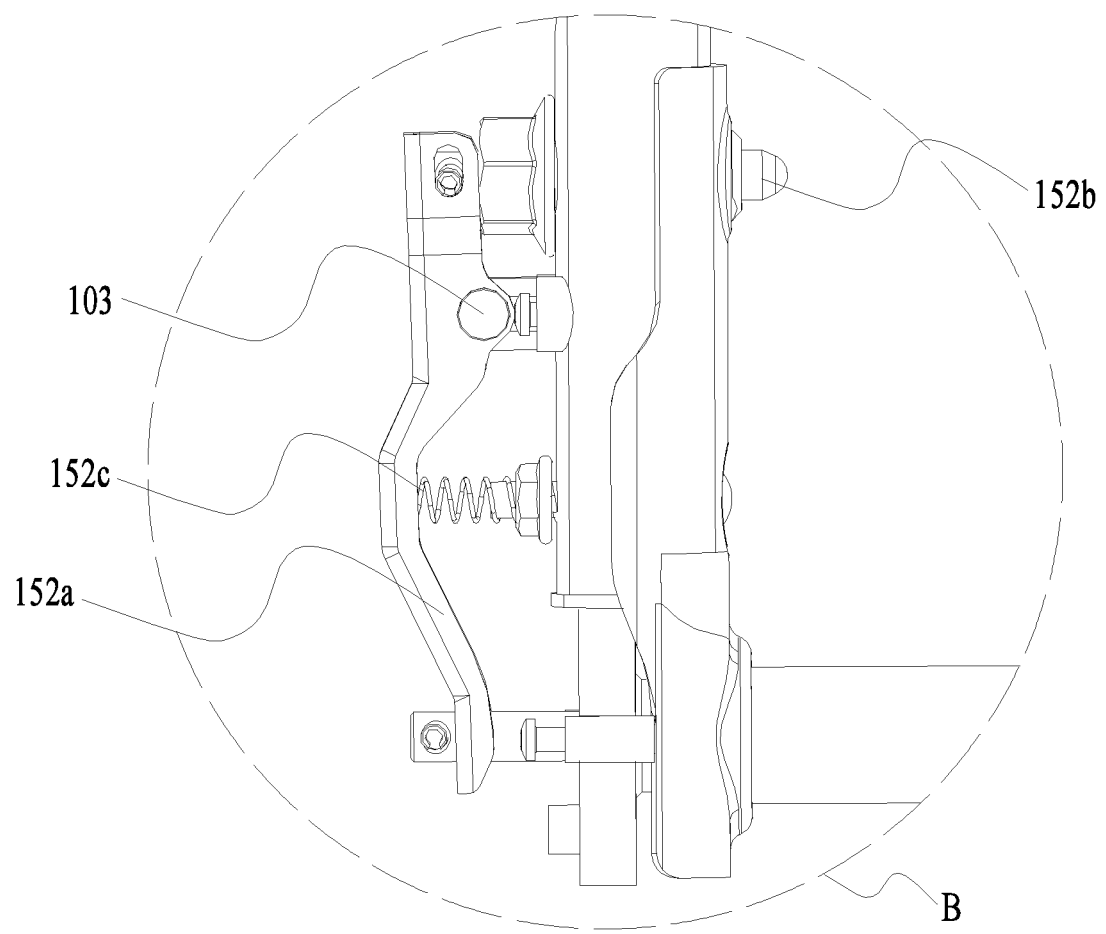
FIG. 5 is a partial enlarged view of portion B of the hand-propelled power tool shown in FIG. 3.

Referring to FIGS. 1 to 2, an example of the hand-propelled power tool is a lawnmower 100. The lawnmower 100 includes a main body 11, a handle assembly 12, and a walking assembly 13. The walking assembly 13 is connected to the main body 11 and is operative to drive the lawnmower 100 to walk. The main body 11 includes a main casing 111 that is used to enclose at least part of the main body 11.

The handle assembly 12 is rotatably connected to the main casing 111 and may be rotated to a preset angle to adjust the operating posture or reduce the occupied space to enter a storage state.

The main body 11 further includes a prime mover and a cutting accessory. The cutting accessory can be driven by the prime mover to perform the cutting function. As an implementation, the cutting accessory may specifically be a cutting blade, the prime mover may specifically be a motor, and the main body 11 may be provided with an accommodating space for accommodating the motor. The motor drives the cutting blade to rotate at high speeds.

The handle assembly 12 can be operated by an operator to control the output power, walking path, and walking state of the lawnmower 100. The handle assembly 12 includes a gripping portion 124 for a user to grip, a portion of the gripping portion 124 extending along a first line 100a, and the gripping portion 124 includes a first end 124a and a second end 124b opposite to the first end 124a. The handle assembly 12 includes a connecting rod 121 and an operating portion 122. The connecting rod 121 is connected to the main casing 111 and is rotatable around the main body 11. The operating portion 122 is connected to the connecting rod 121 and is operative to control the lawnmower 100.

Specifically, the connecting rod 121 is rotatably connected to the main body 11, and is operative to rotate around a first rotational axis 101 so that the user can adjust the connecting rod 121 to an appropriate angle, thereby meeting the needs of users of different heights. As an implementation manner, the connecting rod 121 may include a first connecting rod 121a and a second connecting rod 121b. The first connecting rod 121a connects the first end 124a of the gripping portion 124 and the main body 11, and the second connecting rod 121b connects the second end 124b of the gripping portion 124 and the main body 11. The first connecting rod 121a and the second connecting rod 121b are each connected to the main body 11, and are connected as a whole by the first linkage member 151a and the operating portion 122. It will be appreciated that, since they are fixed by the first linkage member 151a and the operating portion 122, the ends of the first connecting rod 121a and the second connecting rod 121b connected to the main body 11 constitute two free ends.

After they are connected to the main body 11, when the operator operates the handle assembly 12 to control the lawnmower 100, the force transmitted from the operating portion 122 to the junction between each of the first connecting rod 121a and the second connecting rod 121b and the main body 11 is relatively concentrated. As a result, the strength of the connection between each of the first connecting rod 121a and the second connecting rod 121b and the main body 11 is insufficient, resulting in an unstable or even shaking connection between each of the first connecting rod 121a and the second connecting rod 121b and the main body 11, seriously affecting the operator's operation.

The first connecting rod 121a is capable of rotating relative to the main body 11 about a first axis. The second connecting rod 121b is capable of rotating relative to the main body 11 about a axis parallel to the first axis.

As an implementation, the junctions of the first connecting rod 121a and the second connecting rod 121b with the main body 11 may be connected as a whole through a pivot shaft 123. In fact, the first rotational axis 101 is located within the pivot shaft 123. As such, when the force exerted by the operator to the operating part 122 is transmitted to the junction between each of the first connecting rod 121a and the second connecting rod 121b and the main body 11, the pivot shaft 123 can effectively transfer the force at the junction between the first connecting rod 121a and the main body 11, or the force at the junction between the second connecting rod 121b and the main body 11. Thus, the force originally acting on the junction between the first connecting rod 121a and the main body 11 or the force acting on the junction between the second connecting rod 121b and the main body 11 can be directly transferred to the pivot shaft 123. While the pivot shaft 123 has a larger contact area with the main body 11, and the stress is more uniform. Furthermore, the pivot shaft 123 is also connected to the free ends of the first connecting rod 121a and the second connecting rod 121b, so that the first connecting rod 121a and the second connecting rod 121b would have a more stable connection with the main body 11, and so they will not shake when being stressed, which otherwise would affect the user's operation.

As an implementation, the lawnmower 100 is further provided with a fixing plate assembly 14 for fixing the handle assembly 12 to a preset angle, and an adjusting assembly 15 for locking the handle assembly 12 to a preset position. The fixing plate assembly 14 includes a first fixing plate 141 that cooperates with the first connecting rod 121a and a second fixing plate 142 that cooperates with the second connecting rod 121b. The first fixing plate 141 is fixedly connected to the main body 11 and is basically located between the first connecting rod 121a and the main body 11. During the rotation of the first connecting rod 121a around the first rotational axis 101, the first connecting rod 121a actually rotates around the first fixing plate 141 as well. The second fixing plate 142 is fixedly connected to the main body 11 and is basically located between the second connecting rod 121b and the main body 11. During the rotation of the second connecting rod 121b around the first rotational axis 101, the second connecting rod 121b actually rotates around the second fixing plate 142 as well. During the rotation of the connecting rod 121 around the fixing plate assembly 14, the fixing plate assembly 14 is provided with a plurality of locking holes 143 for fixing the connecting rod 121. The locking holes 143 are operative to engage with a locking pin in the adjusting assembly 15 to lock the connecting rod 121 at a preset angle.

As shown in FIGS. 2 to 5, in some examples, the adjusting assembly 15 may specifically include a first adjusting assembly 151, a second adjusting assembly 152, and a transmission assembly 153 connecting the first adjusting assembly 151 with the second adjusting assembly 152. The first adjusting assembly 151 is configured to lock or release the rotation of the first connecting rod 121a relative to the main body 11. The first adjusting assembly 151 is used to lock or release the connection between the first connecting rod 121a and the first fixing plate 141. The second adjusting assembly 152 is configured to lock or release the rotation of the second connecting rod 121a relative to the main body 11. The second adjusting assembly 152 is used to lock or release the connection between the second connecting rod 121b and the second fixing plate 142. The first adjusting assembly 151 and the second adjusting assembly 152 have a first movement state from the locked state to the released state and a second movement state from the released state to the locked state. When the first adjusting assembly 151 and the second adjusting assembly 152 are in the first movement state, the transmission assembly 153 can transmit a force between the first adjusting assembly 151 and the second adjusting assembly 152. When the first adjusting assembly 151 and the second adjusting assembly 152 are in the second movement state, the transmission assembly 153 does not transmit a force between the first adjusting assembly 151 and the second adjusting assembly 152. The first adjusting assembly 151 is mounted at the first connecting rod 121a, and the second adjusting assembly 152 is mounted at the second connecting rod 121b. The first connecting rod 121a can be locked to the main body 11 by the first adjusting assembly 151, and the second connecting rod 121b can be locked to the main body 11 by the second adjusting assembly 152. So, the handle can be more stably locked to the main body 11 by two adjusting assemblies, thereby preventing the lawnmower 100 from shaking during operation and improving the strength of the lawnmower 100. The lawnmower 100 further includes an operating member 151c for the user to operate to drive the first adjusting assembly 151 to release the rotation of the first connecting rod 121a relative to the main body 11. The operating member 151c is capable of moving to a first position and a second position relative to the handle assembly 12. When the user operates the operating member 151c to move to the second position, the operating member 151c drives the first adjusting assembly 151 to release the rotation of the first connecting rod 121a relative to the main body 11, and the transmission assembly 153 drives the second adjusting assembly 152 to release the rotation of the second connecting rod 121b relative to the main body 11. So, the user only needs to operate the operating member 151c, that is, the first adjusting assembly 151 can release the rotation of the first connecting rod 121a at the same time, and the second adjusting assembly 152 can also release the rotation of the second connecting rod 121b, thereby facilitating the operation of the user.

When the operating member 151c moves from the first position to the second position, the transmission assembly 153 transmits a force between the first adjusting assembly 151 and the second adjusting assembly 152, so the transmission assembly 153 transmits a motion between the first adjusting assembly 151 and the second adjusting assembly 152. When the operating member 151c moves from the second position to the first position, the transmission assembly 151 does not transmit a force between the first adjusting assembly 151 and the second adjusting assembly 152, so the transmission assembly 153 does not transmit motion between the first adjusting assembly 151 and the second adjusting assembly 152. So that, when the first adjusting assembly 153 moves to release the rotation of the first connecting rod 121a relative to the main body 11, the transmission assembly 153 transmit a motion from the first adjusting assembly 151 to the second adjusting assembly 152. When the first adjusting assembly 153 moves to lock the rotation of the first connecting rod 121a relative to the main body 11, the transmission assembly 153 does not transmit a motion from the first adjusting assembly 151 to the second adjusting assembly 152. Specifically, the first adjusting assembly 151 may include a first linkage member 151a, a first locking member, and a first elastic member 151d, and the first locking member is a first locking pin 151b. The first linkage member 151a connects the first locking pin 151b and the transmission assembly 153. The first linkage member 151a is substantially distributed along an extending direction of the first connecting rod 121a. The first linkage member 151a is rotatably connected to the first connecting rod 121a around a second rotational shaft 102 and is located on the side of the first connecting rod 121a facing away from the second connecting rod 121b. The operating member 151c is connected to the first linkage member 151a, and is operable to control the first linkage member 151a to rotate around the second rotational shaft 102. The first locking pin 151b connects the first connecting rod 121a and the main body 11 to lock the rotation of the first connecting rod 121a. The first locking pin 151b is disposed on the first linkage member 151a and is located on the side of the second rotational shaft 102 away from the operating member 151c. The first connecting rod 121a is also provided with a first through hole through which the first locking pin 151b is can pass. The first through hole can be aligned with the locking hole 143 in the fixing plate assembly 14, then the first locking pin 151b inserts the first locking hole 143 so that the handle assembly 12 can be locked to a preset angle by the first locking pin 151b. In fact, the first adjusting assembly 151 actually forms a lever structure with the second rotational shaft 102 as a fulcrum. When the user operates the operating member 151c, the first locking pin 151b can be controlled to enter or disengage from the locking hole 143, so that the handle assembly 12 can be locked or released.

The first elastic member 151d is configured to drive first locking pin 151b to reset to lock the rotation of the first connecting rod 121a. As an example, a first elastic member 151d may be further provided between the first linkage member 151a and the first connecting rod 121a, where the first elastic member 151d may specifically be a coil spring. More specifically, the first elastic member 151d may be located between the second rotating shaft 102 and the operating member 151c. When the operator operates the operating member 151c to control the first linkage member 151a to rotate in a first direction, work is simultaneously done to compress the first elastic member 151d.

At this time, the first locking pin 151b can be disengaged from the locking hole 143 under the lever action, thereby releasing the handle assembly 12. When the operating member 151c is released, the first elastic member 151d is reset and is operative to push the first linkage member 151a to reset in the second direction. At this time, the first locking pin 151b can enter the locking hole 143 under the lever action, thus locking the handle assembly 12. The first elastic member 151d biases the operating member 151c to move to the first position. So the operating member 151c can release to the first position when the user does not operate the operating member 151c. The second adjusting assembly 152 includes a second linkage member 152a, a second locking member, and a second elastic member 152c, and the second locking member is a second locking pin 152b. The second linkage member 152a is substantially distributed along an extending direction of the second connecting rod 121b. The second linkage member 152a is rotatably connected to the second connecting rod 121b around a third rotational shaft 103 and is located on the side of the second connecting rod 121b away from the first connecting rod 121a. The second linkage member 152a connects the second locking pin 152b and the transmission assembly 153.

The second locking pin 152b configured to connect the second connecting rod 121b and the main body 11 to lock the rotation of the second connecting rod 121b. The second locking pin 152b is arranged on the second linkage member 152a, and a second through hole through which the second locking pin 152b can pass is also provided in the second connecting rod 121b. The second through hole can be aligned with the locking hole 143 in the second fixing plate 142, then the second locking pin 152b inserts the locking hole so that the handle assembly 12 can be locked to a preset angle by the second locking pin 152b. As an implementation, the pivot shaft 123 may be provided with a through-hole through which the transmission assembly 153 can pass. The transmission assembly 153 is disposed in the pivot shaft 123, where one end of the transmission assembly 153 is connected to the first linkage member 151a, and the other end is connected to the second linkage member 152a. When the operator operates the operating member 151c to rotate about the second axis perpendicular to the first axis, the first linkage member 151a rotates in the first direction around the second axis. The operating member 151c is disposed on a side of the second axis, and the first locking pin 151b and the transmission assembly 153 are dispose on another side of the second axis. At this time, the transmission assembly 153 located between the first linkage member 151a and the second linkage member 152a can drive the second linkage member 152a to rotate around the third rotational shaft 103. It will be appreciated that the operating handle may also be arranged on the second linkage member 152a, and when the second linkage member 152a is operated to rotate, the first linkage member 151a may also be driven to rotate synchronously by means of the transmission assembly 153. It should be noted here that the first linkage member 151a and the second linkage member 152a have a linkage relationship through the transmission assembly 153, but the first linkage member 151a and the second linkage member 152a are not rigidly connected; that is, the first linkage member 151a and the second linkage member 152a can have relative displacement. As an implementation, the transmission assembly 153 may be made of a non-rigid material, which may specifically be a steel wire rope, nylon rope, etc., which is capable of transmitting a tensile force, but is unable to transmit a stress or may transmit less stress.

It can be understood that the first locking pin 151b provided on the first linkage member 151a and the second locking pin 152b provided on the second linkage member 152a need to enter the locking holes 143 on the fixing plate assembly 14 at the same time, which requires the first through hole and the second through hole be simultaneously aligned with the locking holes 143 on the fixing plate assembly 14. However, after the handle assembly 12 and the fixing plate assembly 14 are assembled to the main body 11, due to assembly or vibration issues during operation of the lawnmower 100, as well as the rigidity of the handle assembly 12 itself, the first through hole and the second through hole cannot be aligned with the locking holes 143 in the fixing plate assembly 14 at the same time, such that the first locking pin 151b on the first linkage member 151a and the second locking pin 152b on the second linkage member 152a cannot enter the corresponding locking hole 143, or they cannot enter the locking holes 143 synchronously. As a result, the handle assembly 12 cannot be locked. By providing the first linkage member 151a and second linkage member 152a that are non-rigidly connected, even if the first through hole and the second through hole are not aligned with the locking holes 143 in the fixing plate assembly 14 at the same time, the first locking pin 151b provided on the first linkage member 151a or the second locking pin 152b arranged on the second linkage member 152a can still enter the locking hole 143, and after one of the locking pins enters the corresponding locking hole 143, the other connecting rod can be shaken so that the other locking pin can also enter the corresponding locking hole 143. In addition, even if one of the locking pins cannot enter the corresponding locking hole 143, the other locking pin will not be prevented from entering the corresponding locking hole 143 due to the linkage relationship between the first linkage member 151a and the second linkage member 152a. That is, by providing the non-rigid connection between the first linkage member 151a and the second linkage member 152a, the first locking pin 151b and the second locking pin 152b arranged on the first linkage member 151a and the second linkage member 152a can both enter their respective locking holes 143, thereby ensuring the reliability of the handle assembly 12 entering the locked state from the released state.

In fact, the second adjusting assembly 152 actually forms a lever structure with the third rotational shaft 103 as a fulcrum. When the transmission assembly 153 drives the second linkage member 152a to rotate in the first direction, the second linkage member 152a can drive the second locking pin 152b to disengage from the corresponding locking hole 143, thereby releasing the handle assembly 12. As an implementation, a second elastic member 152c may be further arranged between the second linkage member 152a and the second connecting rod 121b. The second elastic member 152c is configured to drive second locking pin 152b to reset to lock the rotation of the second connecting rod 121b. More specifically, in the extending direction of the second connecting rod 121b, the second elastic member 152c is disposed between the third rotating shaft 103 and the transmission assembly 153. When the transmission assembly 153 drives the second linkage member 152a to rotate in the first direction, the second elastic member 152c is compressed. When the operating member 151c is released, the first elastic member 151d is reset so that the first linkage member 151a rotates in the second direction. At the same time, the second elastic member 152c is also reset, making the second linkage member 152a rotate in the second direction under the leverage, so that the second locking pin 152b provided on the second linkage member 152a enters the locking hole 143 in the second fixing plate 142, thereby locking the handle assembly 12.

It can be understood that, since the first linkage member 151a and the second linkage member 152a are connected by a non-rigid connection through the transmission assembly 153, the first linkage member 151a and the second linkage member 152a can be reset under the actions of the first elastic member 151d and the second elastic member 152c, and the first linkage member 151a and the second linkage member 152a will not interfere with each other. Thus, the first locking pin 151b and the second locking pin 152b can lock the first linkage member 151a and the second linkage member 152a, separately.

Figure 6:
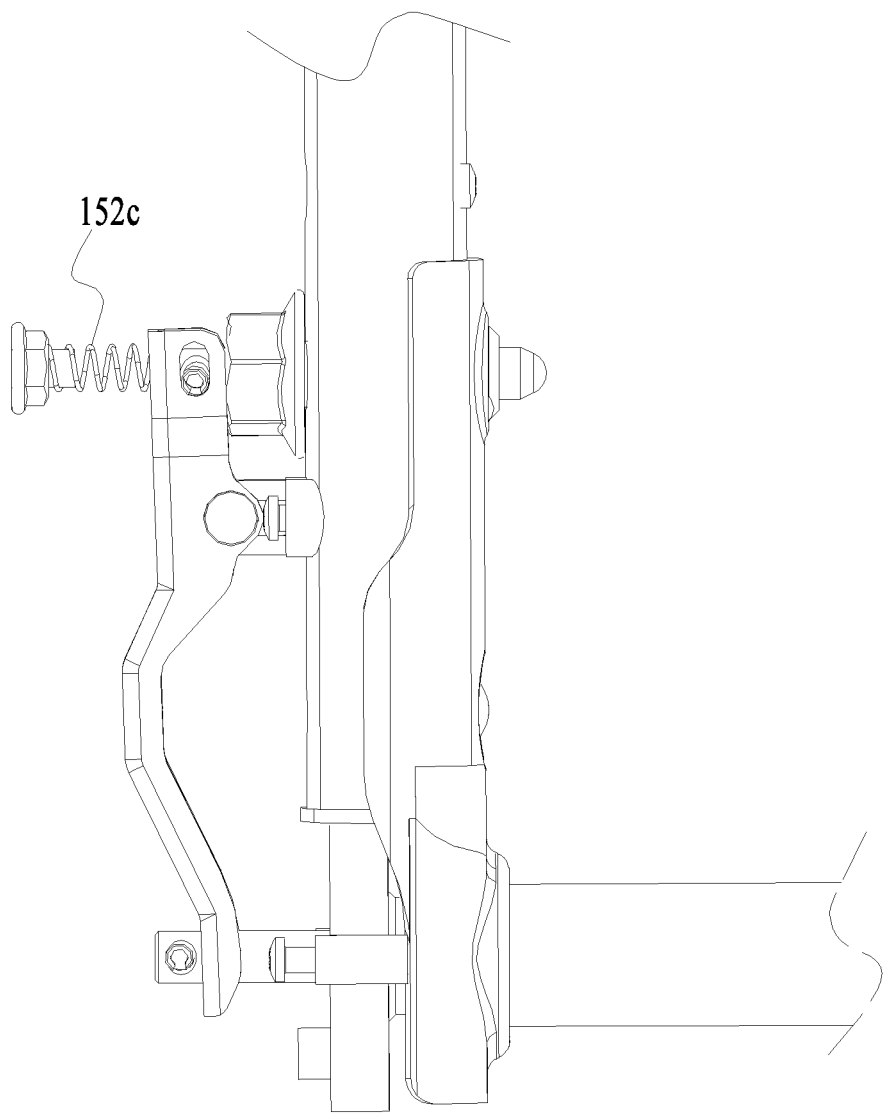
FIG. 6 is a perspective view of another arrangement of a second elastic member of the hand-push power tool illustrated in FIG. 3.

As illustrated in FIG. 6, as another implementation, the second elastic member 152c may also be directly disposed on the end of the second locking pin 152b on the second linkage member 152a away from the first linkage member 151a. At this time, when the transmission assembly 153 drives the second linkage member 152a to rotate in the first direction, the second elastic member 152c is compressed. When the operating member 151c is released, the first elastic member 151d is reset so that the first linkage member 151a in the second direction. At the same time, the second elastic member 152c is also reset, directly driving the second linkage member 152a to rotate in the second direction, so that the second locking pin 152b provided on the second linkage member 152a enters the locking hole 143 in the second fixing plate 142, thereby locking the handle assembly 12.

When the operator needs to adjust the angle of the handle assembly 12 relative to the main body 11, the operating member 151c may be operated to make the first linkage member 151a rotate around the second rotational shaft 102 in the first direction, and at this time, the first elastic member 151d is compressed so that the first locking pin 151b on the first linkage member 151a is disengaged from the corresponding locking hole 143 in the fixing plate 141. Simultaneously, the transmission assembly 153 connected between the first linkage member 151a and the second linkage member 152a drives the second linkage member 152a to rotate about the third rotational shaft 103 in the first direction. At this time, the second elastic member 152c is compressed, and the second locking pin 152b on the second linkage member 152a is disengaged from the corresponding locking hole 143 in the second fixing plate 142. At this point, the handle assembly 12 is released and can freely rotate around the first rotational axis 101. When the handle assembly 12 is rotated to the preset position, the operator may release the operating member 151c, at which time the first linkage member 151a is reset under the action of the first elastic member 151d, and the second linkage member 152a is also reset under the action of the second elastic member 152c. The first locking pin 151b provided on the first linkage member 151a can be driven by the first linkage member 151a to enter the locking hole 143 in the first fixing plate 141, and the second locking pin 152b provided on the second linkage member 152a can be driven into the locking hole 143 in the second fixing plate 142 by the second linkage member 152a, thereby realizing the locking purpose.

Figure 7:
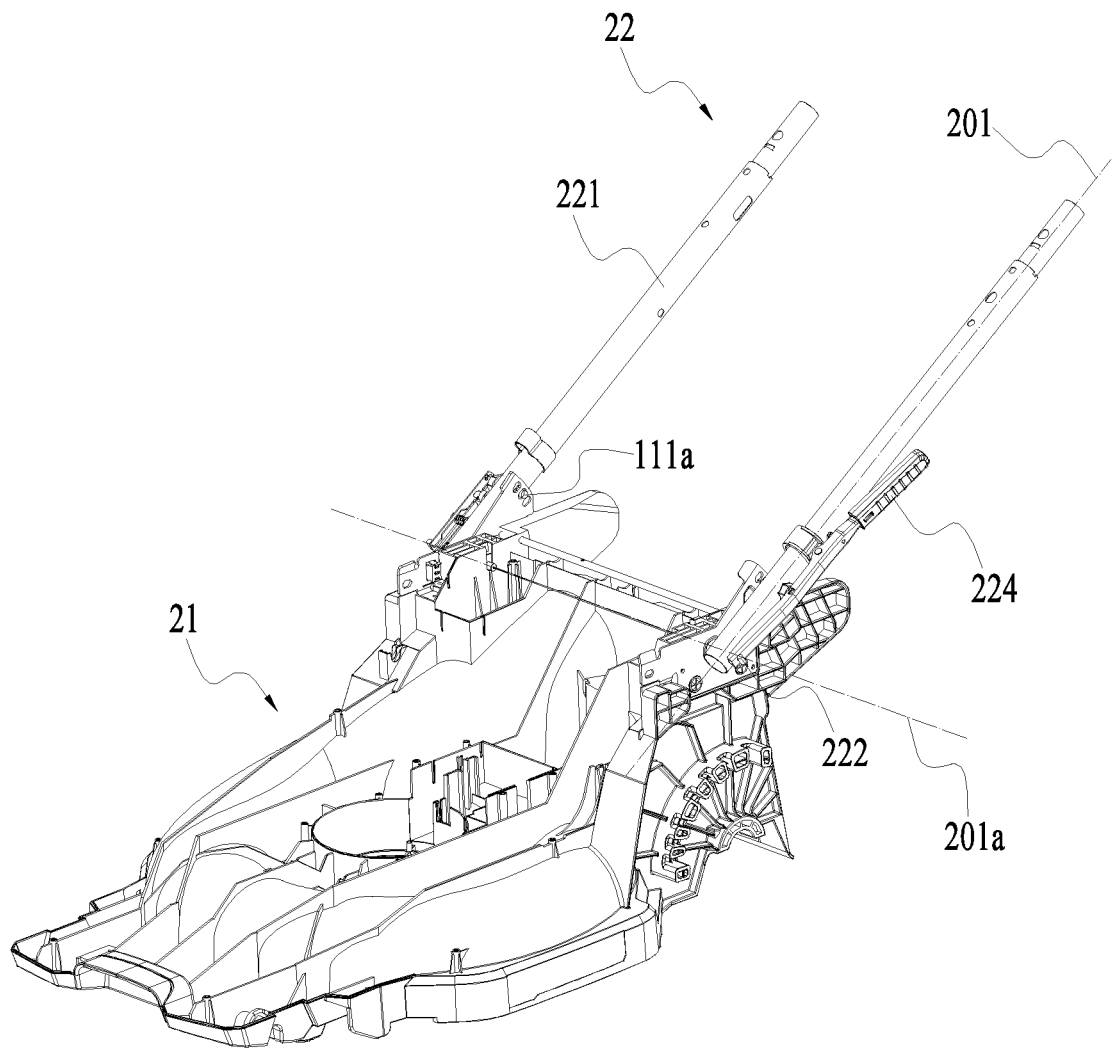
FIG. 7 is a schematic view of a partial structure of a hand-propelled power tool according to a second example.

As illustrated in FIGS. 7 to 10, the hand-propelled power tool according to the second example also includes a handle device 22 and a main body 21, where FIG. 7 only shows a partial structure of the handle device 22 and the main body 21. The hand-propelled power tool according to this example differs from that according to the first example in that the structure of the adjusting assembly 222 of the handle device 22 and the principle of adjusting the position of the handle device 22 relative to the main body 21 are different, while the same features as those in the first example can all be applied to this example.

The operating assembly 224 is configured for being operated by the user. The connecting member and the main body 21 form a slidable connection along the second straight line 201, where the second straight line 201 is substantially perpendicular to a first axis 201a. The connecting member may specifically be a bolt. The main body 21 is provided with a matching portion 211a that collaborates with the connecting member, where the matching portion 211a may specifically be a hole that fits with the bolt to form a shaft-hole-fitting. The operating assembly 224 includes a handle used to be operated by the user. The adjusting assembly is movably connected to the elongated rod body 221, and is operative to rotate relative to the elongated rod body 221 with the first axis 201a as the rotational axis. The connecting member forms a fixed connection or a linkage with the operating assembly 224 along the second straight line 201. When needing to switch the adjusting assembly from the locked state to the released state, a driving force F1 as illustrated by the arrow in FIG. 8 may be applied to the operating assembly 224, and so the adjusting assembly rotates counterclockwise about the second axis, thereby driving the connecting member to be disengaged from the matching portion 211a, so that the adjusting assembly is switched to the released state, where the second axis is perpendicular to the plane in which the elongated rod body 221 lies.

Figure 8:
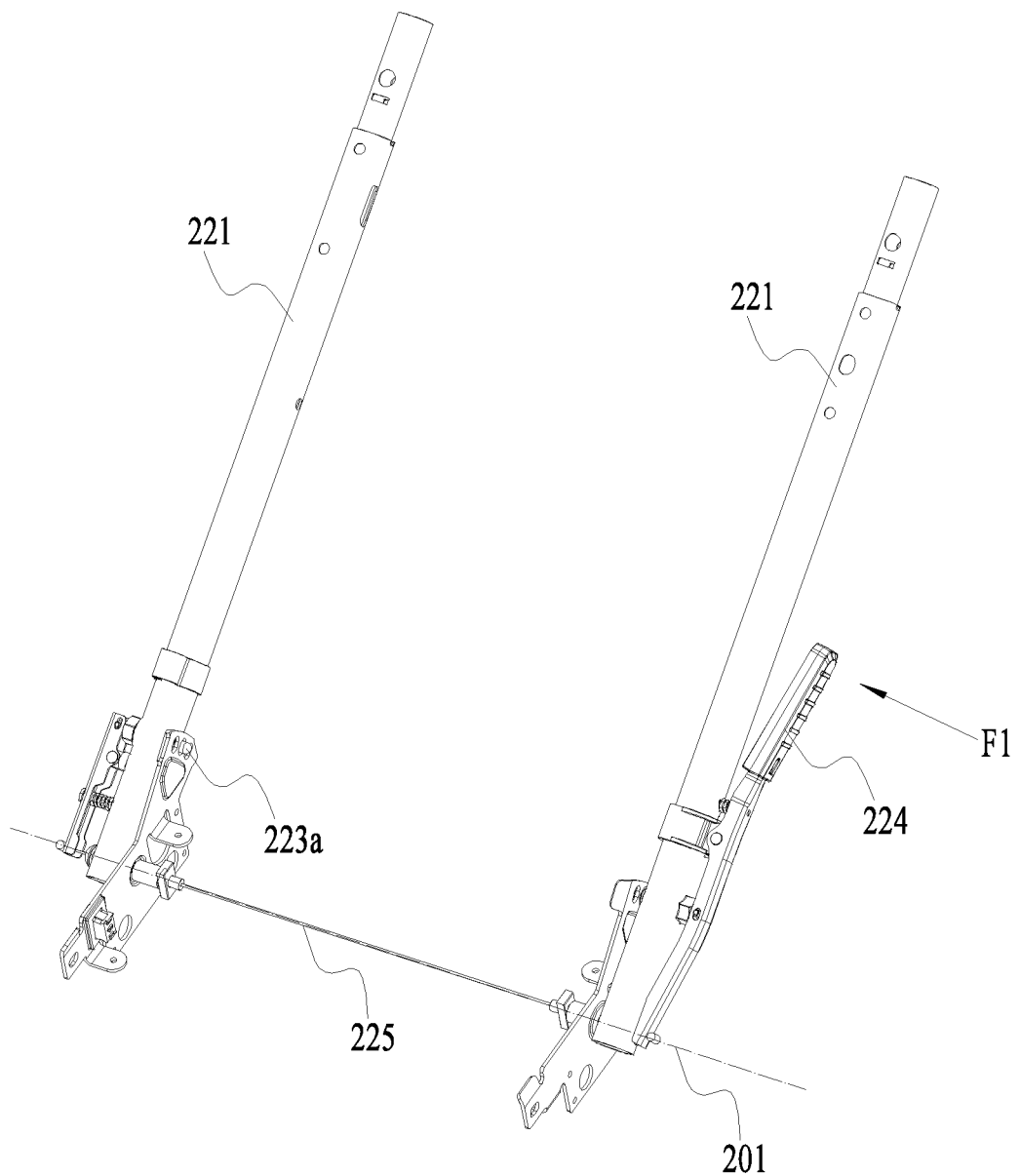
FIG. 8 is a perspective view of a partial structure of the hand-propelled power tool of FIG. 7.
Figure 9:
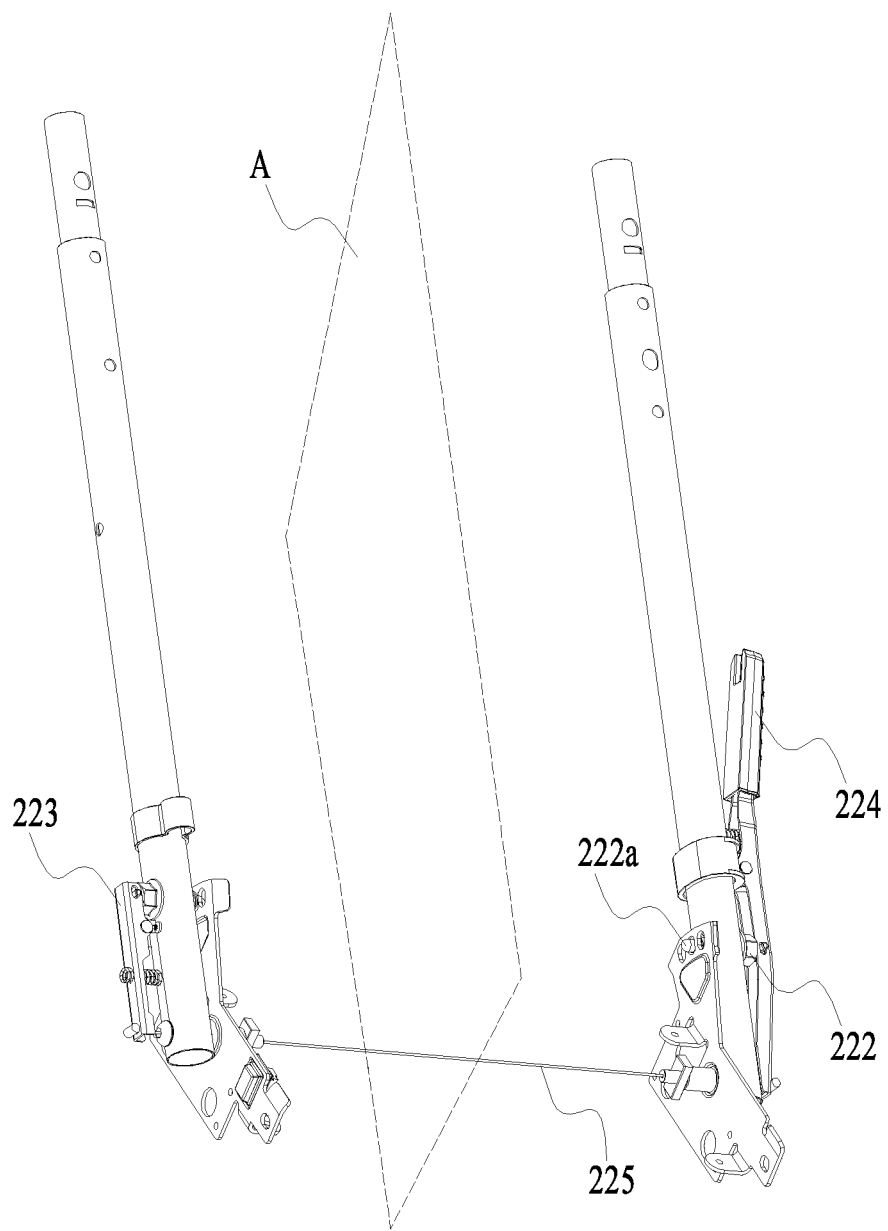
FIG. 9 is a perspective view of a partial structure of the hand-propelled power tool of FIG. 7 observed from another perspective.
Figure 10:
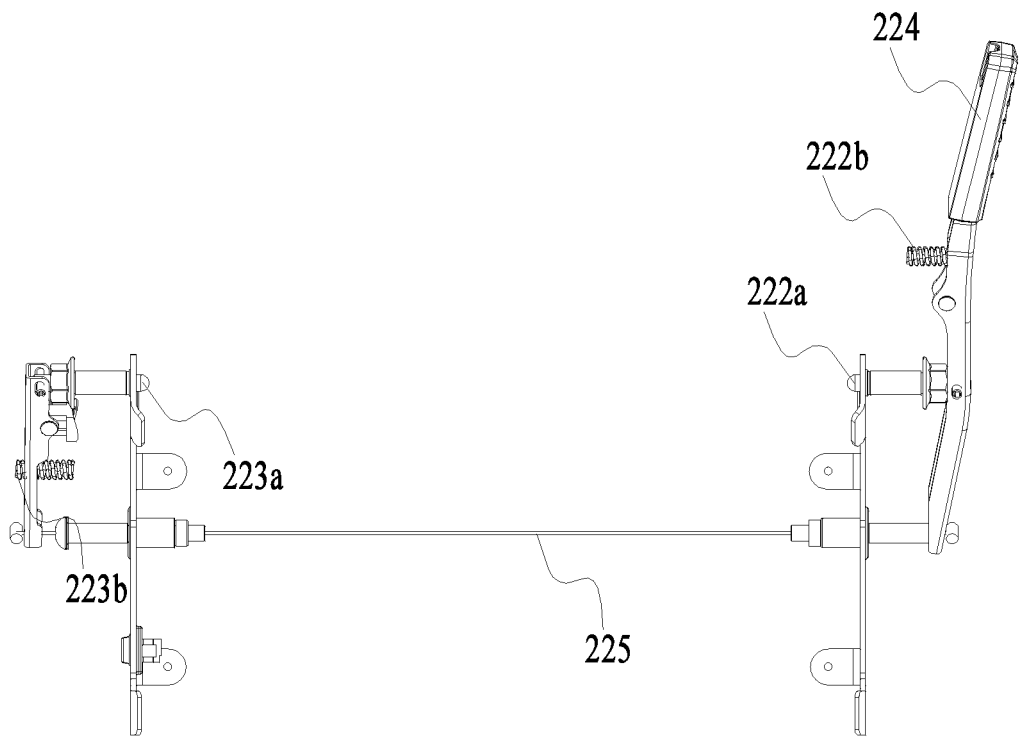
FIG. 10 is a front view of a partial structure of the hand-propelled power tool of FIG. 7.

As shown in FIGS. 8 to 10, the elongated rod body 221 has a bisecting plane A. The elongated rod body 221 is substantially symmetrical about the bisecting plane A and includes a first connecting rod and a second connecting rod. At least two connecting members 222a are respectively disposed on both sides of the bisecting plane A and form a linkage with each other. In this example, a first adjusting assembly 222 is provided on one side of the first connecting rod, and includes a first connecting member 222a. A second adjusting assembly 223 is provided on one side of the second connecting rod, and includes a second connecting member 223a. The second connecting member 223a may also be an insertion bolt.

The second connecting member 223a and the first adjusting assembly 222 form a linkage. Specifically, the second connecting member 223a may form a linkage with the first adjusting assembly 222 through the transmission assembly 225. The transmission assembly 225 includes a rope extending in a direction parallel to the second straight line 201. When the first adjusting assembly 222 is driven to rotate about the second axis in the counterclockwise direction, the second adjusting assembly 223 may rotate about the third axis in the counterclockwise direction under the drive of the rope, thereby causing the second connecting member 223a to be disengaged from the matching portion 211a, and so the second adjusting assembly 223 is switched to the released state, where the third axis is parallel to the second axis.

The first adjusting assembly 222 and the second adjusting assembly 223 include a first elastic member 222b and a second elastic member 223b, respectively. The first elastic member 222b and the second elastic member 223b may be elastically deformed in a direction parallel to the second straight line 201. When the driving force F2 exerted on the operating assembly 224 is released, the first connecting member 222a and the second connecting member 223a may rebound to their original positions under the action of the elastic forces of the first elastic member 222b and the second elastic member 223b, and so the first adjusting assembly 222 and the second adjusting assembly 223 are switched to the locked state. The first elastic member 222b and the second elastic member 223b are typically compression springs. The rope of the transmission assembly 225 typically has a metal rope or brake wire with certain strength. Specifically, the operating assembly 224 is disposed on the upper end of the first adjusting assembly 222. The rope passes through the first connecting rod and connects the lower end of the first adjusting assembly 222 to the lower end of the second adjusting assembly 223.

Figure 11:
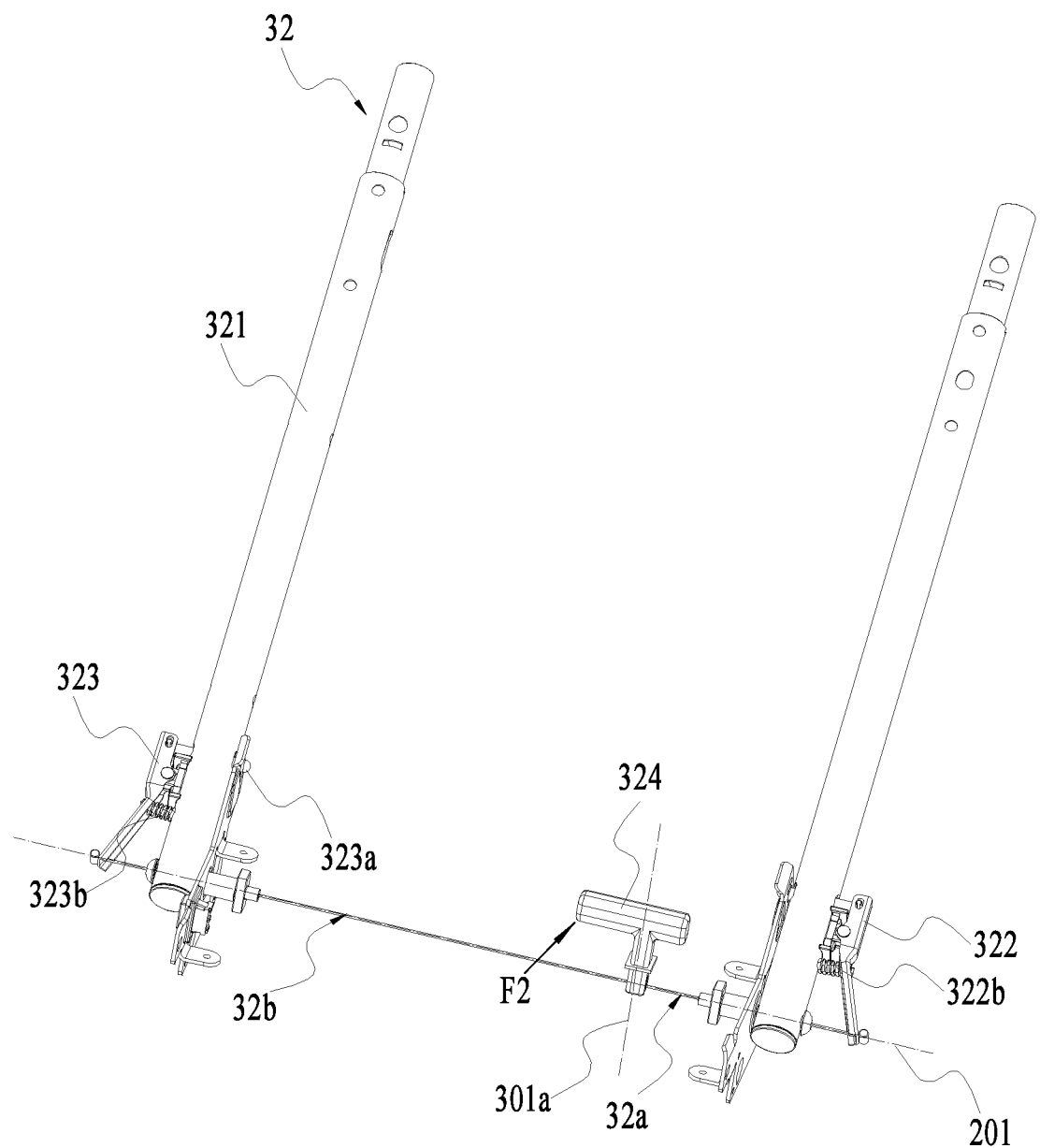
FIG. 11 is a schematic view of a partial structure of a hand-propelled power tool according to a third example, in which the adjusting assembly is in a locked state.
Figure 12:
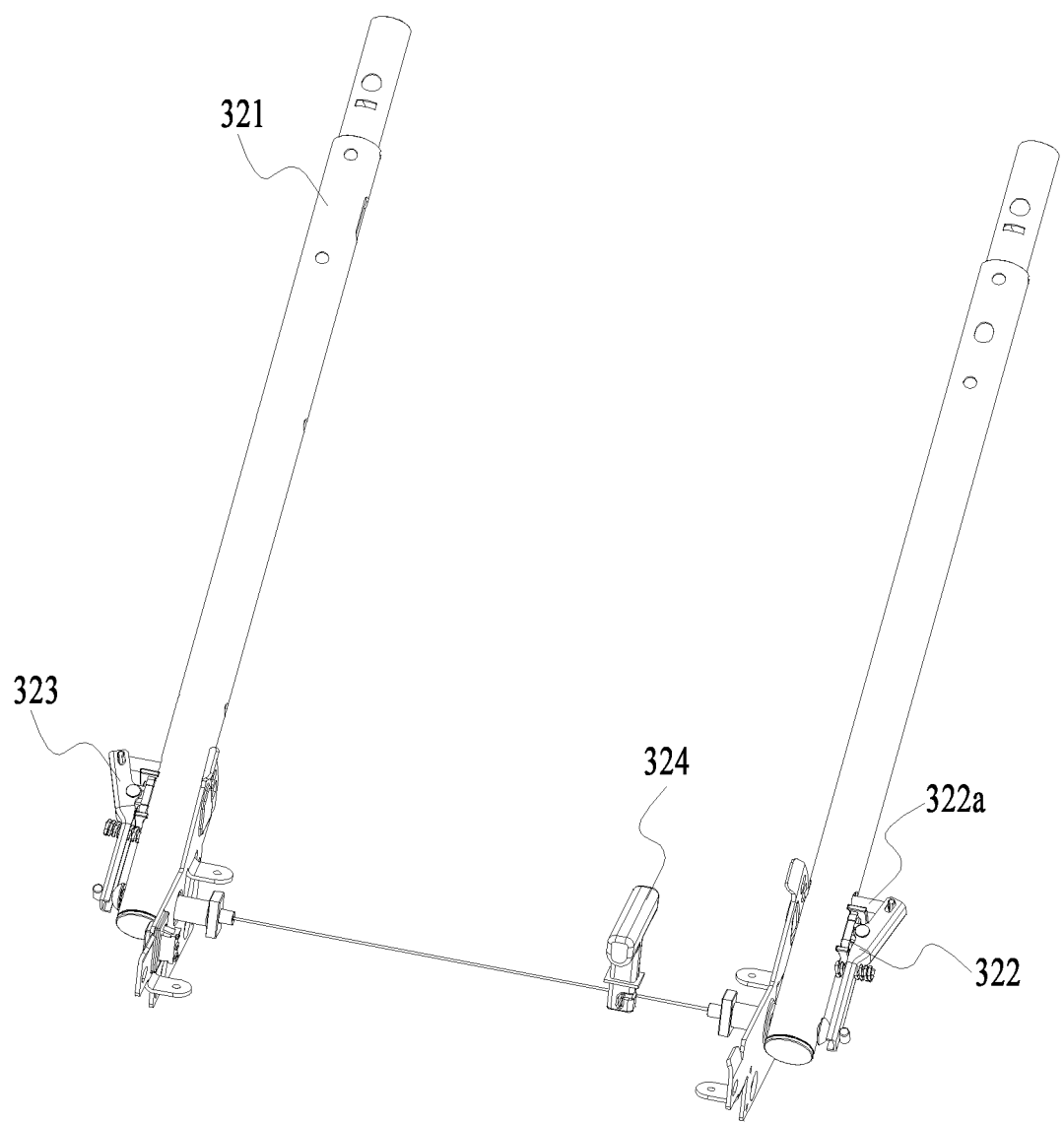
FIG. 12 is a schematic view of a partial structure of a hand-propelled power tool according to the third example, in which the adjusting assembly is in a released state.
Figure 13:
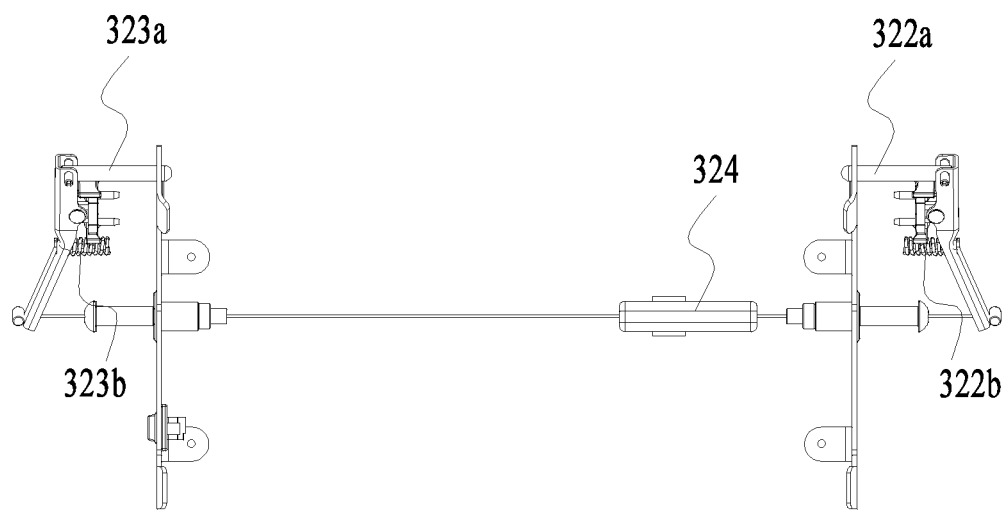
FIG. 13 is a plan view of a partial structure of a hand-propelled power tool according to the third example.

FIGS. 11 to 13 show a partial structure of a handle device 32 and a main body of a hand-propelled power tool according to the third example. The principle of adjusting the position of the handle device 32 relative to the main body in this example is basically the same as that in the second example. The difference lies in the specific structure of the adjusting assembly. The similarities between this example and the second example can all be applied to this example.

In this example, a first adjusting assembly 322 and a second adjusting assembly 323 are arranged on both sides of the bisecting plane of the elongated rod body 321, respectively. The first adjusting assembly 322 and the second adjusting assembly 323 are connected by a rope and are substantially symmetrical about the bisecting plane. The first adjusting assembly 322 includes a first locking pin 322a and a first elastic member 322b having the same functions as those in the first example. The second adjusting assembly 323 includes a second locking pin 323a and a second elastic member 323b having the same functions as those in the first example. The first locking pin 322a and the second locking pin 323a each form a slidable connection with the elongated rod body 321 along the second straight line 201. Both the first locking pin 322a and the second locking pin 323a are insertion bolts. The handle device 32 also includes an operating member 324 used for being operated. The hand-propelled power tool further comprises a first transmission assembly 32a and a second transmission assembly 32b. The first transmission assembly 32a is used to transmit a power between the operating member 324 and the first adjusting assembly 323, and the second transmission assembly 32b is used to transmit a power between the operating member 324 and the second adjusting assembly 322. The main body includes a first plate and a second plate having the same functions as those in the first example.

The operating member 324 is connected to the rope, and by operating the operating member 324 the effective length (straight line length) of the rope between the first adjusting assembly 322 and the second adjusting assembly 323 can be changed.

In this example, the rope passes through the operating member 324, and a rotational force F2 may be applied to the operating member 324 to make the operating member 324 rotate about the third axis 301a thus changing the effective length of the rope between the first adjusting assembly 322 and the second adjusting assembly 323, so that the first adjusting assembly 322 and the second adjusting assembly 323 are switched from the locked state illustrated in FIG. 11 to the released state illustrated in FIG. 12 under the driving of the rope. When the user releases the operating member 324, the first locking pin 322a and the second locking pin 323a may rebound to their original positions under the elastic forces of the first elastic member 322b and the second elastic member 323b, respectively, so that the first adjusting assembly 322 and the second adjusting assembly 323 are switched from the released state illustrated in FIG. 12 to the locked state illustrated in FIG. 11, while the operating member 324 rotates back to its original position, and the rope is restored to its original effective length.

Figure 14:
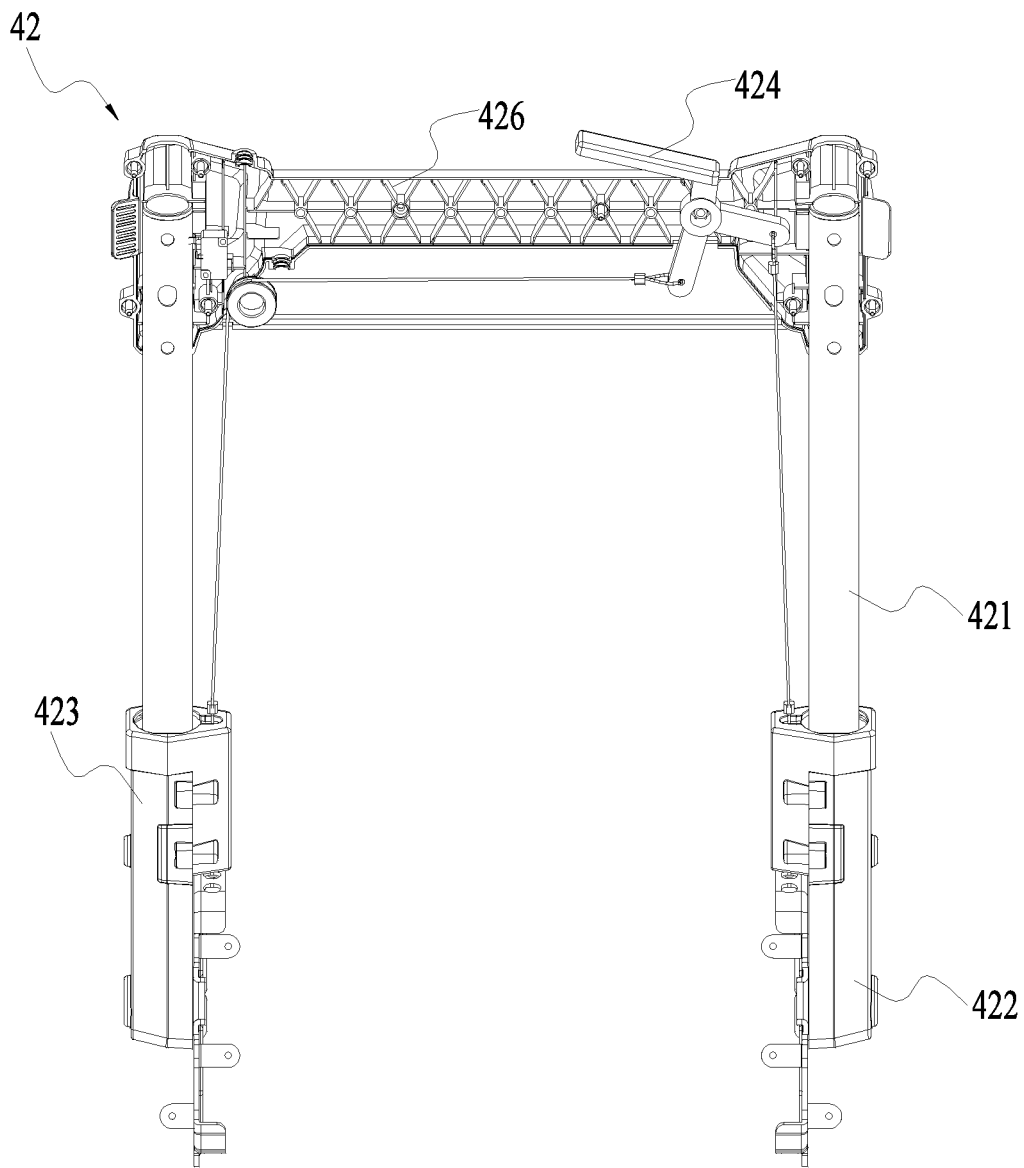
FIG. 14 is a schematic view of a partial structure of a hand-propelled power tool according to a fourth example.
Figure 15:
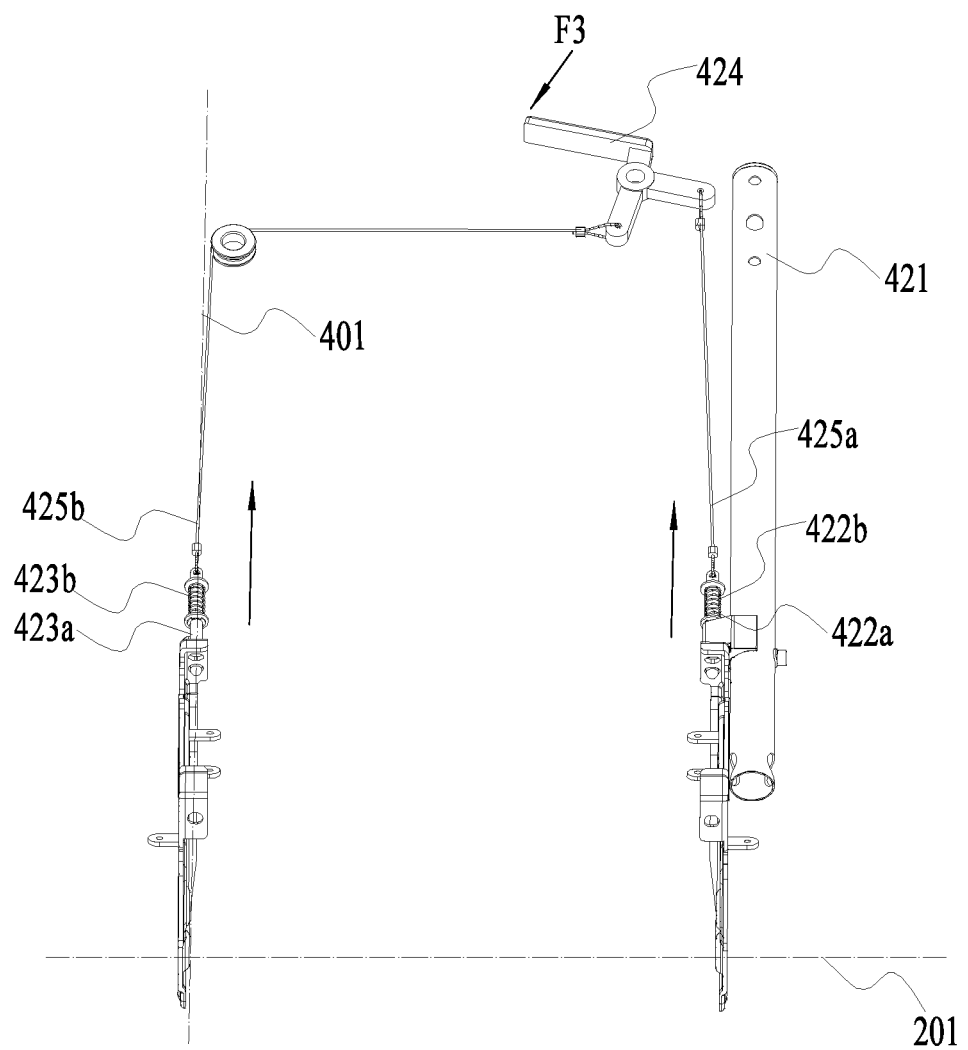
FIG. 15 is a perspective view of a partial structure of the hand-propelled power tool of FIG. 14.

FIGS. 14 and 15 are schematic diagrams illustrating a partial structure of a handle device 42 and a main body according to the fourth example. The principle of adjusting the position of the handle device 42 relative to the main body in this example is basically the same as that in the first example. The difference lies in the specific structure of the adjusting assembly. The similarities between this example and the first example can all be applied to this example.

In this example, a first adjusting assembly 422 and a second adjusting assembly 423 are arranged on both sides of the bisecting plane of the elongated rod body 421, respectively. The first adjusting assembly 422 and the second adjusting assembly 423 are connected by a rope and are substantially symmetrical about the bisecting plane. The first adjusting assembly 422 includes a first connecting member 422a and a first elastic member 422b having the same functions as those in the second example. The second adjusting assembly 423 includes a second connecting member 423a and a second elastic member 423b having the same functions as those in the second example. The first connecting member 422a and the second connecting member 423a each form a slidable connection with the elongated rod body 421 along a first straight line 401. Both the first connecting member 422a and the second connecting member 423a are insertion bolts. The handle device 42 further includes an operating assembly 424 used for being operated by the user. The operating assembly 424 is connected to a rope, and can be operated in order to drive the first connecting member 422a and the second connecting member 423a to move relative to the main body in the first straight line 401. Specifically, since the first connecting member 422a and the second connecting member 423a each form a shaft-hole-fitting with the matching portion on the main body, the first connecting member 422a and the second connecting member 423a may perform a sliding motion relative to the main body in the first straight line 401.

Specifically, the operating assembly 424 is disposed above the adjusting assembly. Typically, the operating assembly 424 is disposed above at least a part of the elongated rod body 421 to facilitate user operation. One end of the operating assembly 424 is connected to the first connecting member 422a through a first rope 425a, which extends in the first straight line 401. The other end of the operating assembly 424 is connected to the second connecting member 423a through a second rope 425b. At least a portion of the second rope 425b extends in the first straight line 401. In this example, the second rope 425b changes its extending direction by connecting to a fixed pulley, so that the extending direction of the other part of the rope is substantially parallel to the second straight line 201. In this example, a handle housing 426 for mounting the operating assembly 424 and the fixed pulley is provided between the elongated rod body 421. The operating assembly 424 forms a rotatable connection relative to the handle housing 426.

As shown in the figures, both the first adjusting assembly 422 and the second adjusting assembly 423 are in a locked state. When a driving force F3 in the direction indicated by the arrow is applied to the operating assembly 424, the operating assembly 424 would rotate relative to the handle housing 426 in the counterclockwise direction, and the first connecting member 422a and the second connecting member 423a would move in the direction indicated by the arrow under the pulling of the first rope 425a and the second rope 425b, respectively, so that the first adjusting assembly 422 and the second adjusting assembly 423 would switch from the locked state to the released state.

The first elastic member 422b and the second elastic member 423b are mounted to the first connecting member 422a and the second connecting member 423a, respectively. When the first connecting member 422a moves upward as indicated by the arrow, the first elastic member 422b is stretched. When the driving force F3 is released, the first connecting member 422a rebounds to its original position under the elastic force of the first elastic member 422b. Similarly, when the second connecting member 423a moves upward as indicated by the arrow, the second elastic member 423b is stretched. When the operating assembly 424 is released, the second connecting member 423a rebounds to its original position under the elastic force of the second elastic member 423b, thus making the first adjusting assembly 422 switch from the released state to the locked state.

Figure 16:
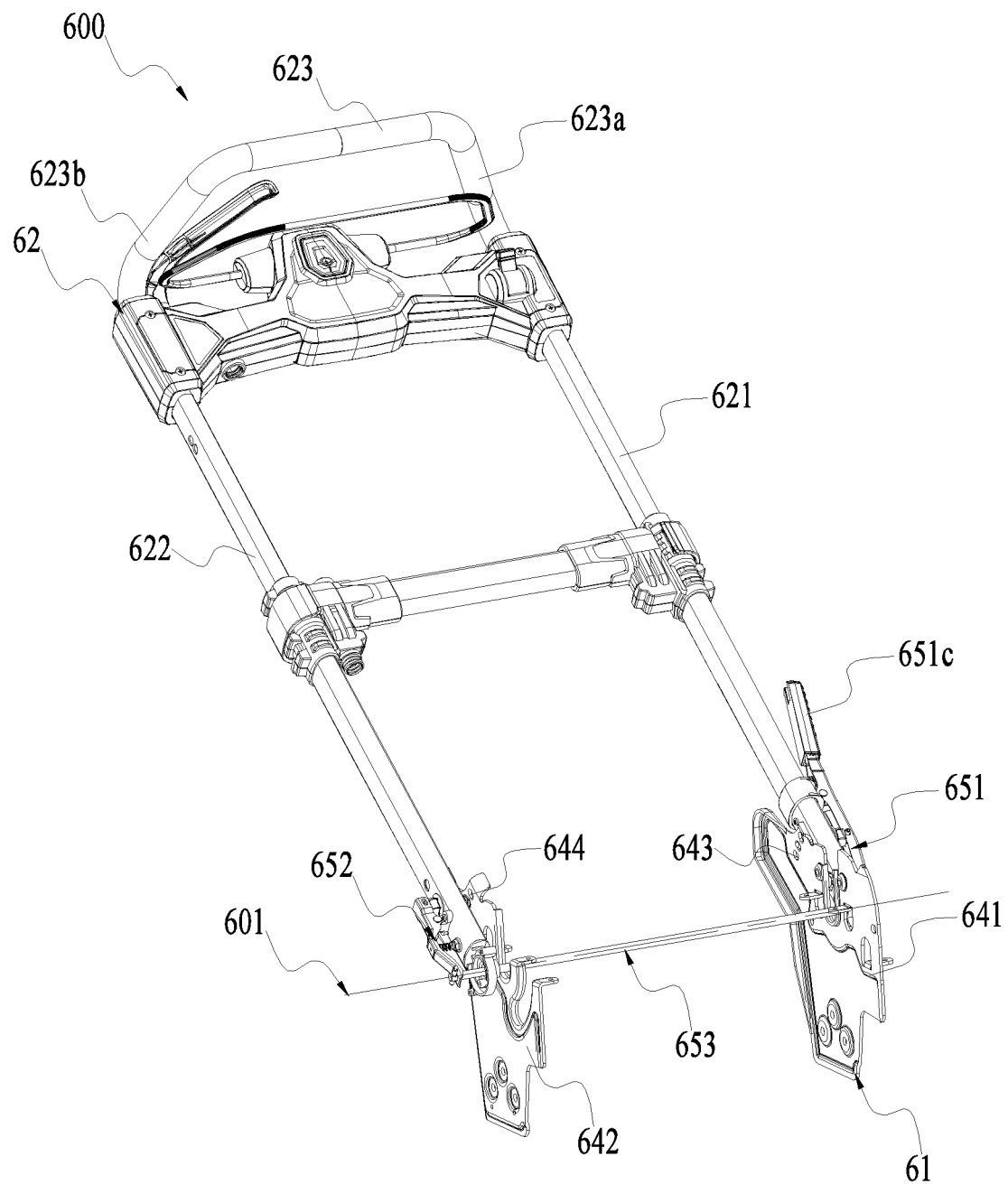
FIG. 16 is a schematic view of a partial structure of a hand-propelled power tool according to a fifth example.
Figure 17:
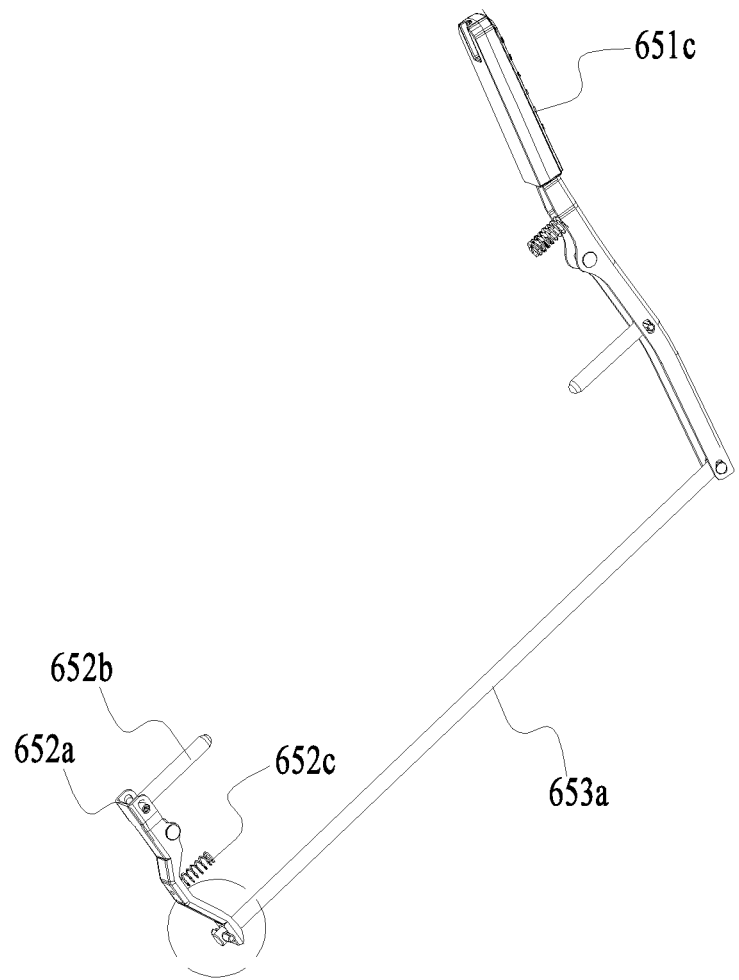
FIG. 17 is a partial structure of the handle devise according to the fifth example.
Figure 18:
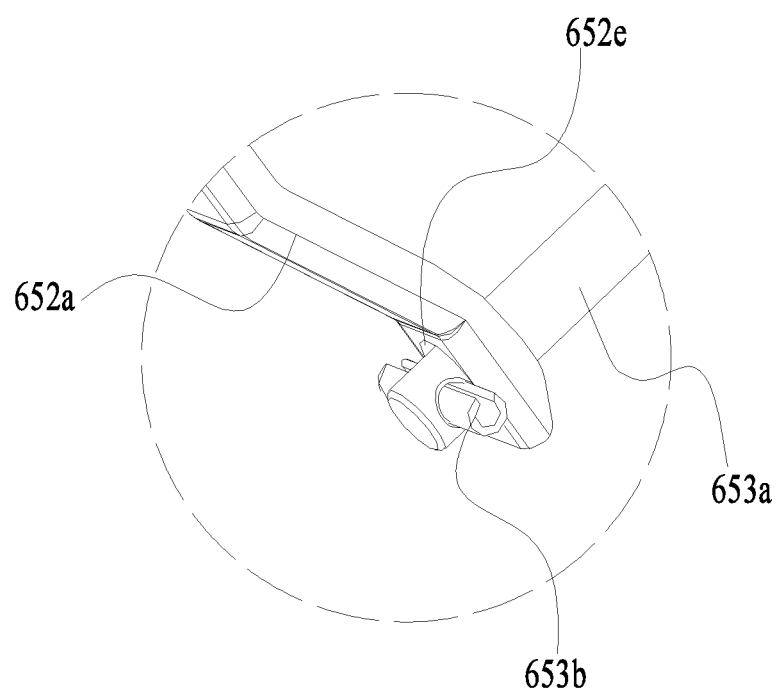
FIG. 18 is an enlarged view of a part of the structure shown in FIG. 17.

FIG. 16 shows a partial structure of a hand-propelled power tool 600 of a fifth example. In this example, the hand-propelled power tool 600 is a lawnmower. As shown in FIGS. 16 to 18, the hand-propelled power tool 600 includes a handle device and a main body 61, and the main body 61 has substantially the same structure as the main body 11 in the first example. The handle device includes a handle assembly 62, and the handle assembly 62 includes a gripping portion 623, a first connecting rod 621, and a second connecting rod 622. The gripping portion 623 is used for the gripping portion 623 held by the user. The gripping portion 623 includes opposite ends, and the opposite ends are a first end 623a and a second end 623b. The first connecting rod 621 connects the first end 623a of the gripping portion 623 and the main body 61, and the second connecting rod 622 connects the second end 623b of the gripping portion 623 and the main body 61.

The handle device can rotate relative to the main body 61 about a first rotational axis 601. When the handle device rotates relative to the main body 61 about the first rotational axis 601, the handle device can rotate relative to the main body 61 about the first rotational axis 601 to a folded position and an operating position. The handle device can be in a plurality of different operating positions relative to the main body 61, so that users with different heights can comfortably operate the hand-propelled power tool 600.

The handle device further includes a first adjusting assembly 651 and a second adjusting assembly 652, the first adjusting assembly 651 is used to lock or release the rotation of the first connecting rod 621 relative to the main body 61, and the second adjusting assembly 652 is used to lock or release the rotation of the second connecting rod 622 relative to the main body 61. The first adjusting assembly 651 is mounted to the first connecting rod 621, and the second adjusting assembly 652 is mounted to the second connecting rod 622. The first adjusting assembly 651 is disposed on the left side of the hand-propelled power tool 600, and the second adjusting assembly 652 is disposed on the right side of the hand-propelled power tool 600. The rotation of the first connecting rod 621 and the second connecting rod 622 relative to the main body 61 is locked by the first adjusting assembly 651 and the second adjusting assembly 652 respectively, so that the structure of the hand-propelled power tool 600 is more stable, the shaking of the handle device relative to the main body 61 is small, and the structural strength of the hand-propelled power tool 600 is improved.

The handle device further includes an operating member 651c and a transmission assembly 653. The operating member 651c can move to a first position and a second position relative to the first connecting rod 621. When the operating member 651c moves from the first position to the second position, the operating member 651c drives the first adjusting assembly 651 to release the rotation of the first connecting rod 621 with respect to the main body 61, and the first connecting rod 621 can rotate relative to the main body 61 at this time.

The transmission assembly 653 is used to connect the first adjusting assembly 651 and the second adjusting assembly 652. When the first adjusting assembly 651 releases the rotation of the first connecting rod 621 relative to the main body 61 under the driving of the operating member 651c, the transmission assembly 653 transmits the movement of the first adjusting assembly 651 to the second adjusting assembly 652 and drives the second adjusting assembly 652 moves, and the second adjusting assembly 652 releases the rotation of the second connecting rod 622 relative to the main body 61 under the driving of the transmission assembly 653. In this way, the user only needs one hand to operate the operating member 651c, so that the first adjusting assembly 651 can release the rotation of the first connecting rod 621 relative to the main body 61, and can also cause the second adjusting assembly 652 to release the rotation of the second connecting rod 622 relative to the main body, which makes user operation more convenient and faster.

In this example, when the operating member 651c moves from the first position to the second position, the transmission assembly 653 transmits a force between the first adjusting assembly 651 and the second adjusting assembly 652. When the first adjusting assembly 651 releases the rotation of the first connecting rod 621 relative to the main body 61, the second adjusting assembly 652 can also release the rotation of the first connecting rod 621 relative to the main body 61. When the operating member 651c moves from the second position to the first position, the transmission assembly 653 cannot transmit a force between the first adjusting assembly 651 and the second adjusting assembly 652. In this way, when a first locking pin 651b of the first adjusting assembly 651 is inserted into a first locking hole 643 on a first fixing plate 641, the first adjusting assembly 651 no longer restricts the movement of the second adjusting assembly 652. Thus, the movement of a second locking pin 652b of the second adjusting assembly 652 will not be restricted by the first adjusting assembly 651, so that the second locking pin 652b can automatically align with a second locking hole 644 under the action of a second elastic member 652c and inserted into the second locking hole 644, thereby avoiding the problem that the second locking pin 652b is restricted by the first adjusting assembly 651 and cannot be aligned with the second locking hole 644 when resetting. The operating member 651c may be regarded as a part of the first adjusting assembly 651, or a part of the operating member 651c may be regarded as a part of the first adjusting assembly 651.

In this example, the transmission assembly 653 includes a connecting member 653a and a limiting member 653b. The connecting member 653a connects the first adjusting assembly 651 and the second adjusting assembly 652. The connecting member 653a is a rigid connecting rod, and the rigid connecting rod extends along the first rotational axis 601. One end of the connecting member 653a is connected to the operating member 651c, and the operating member 651c is rotatably connected to the connecting member 653a. The operating member 651c is also rotatably connected to the first connecting rod 621. When the operating member 651c rotates relative to the first connecting rod 621, it can drive the connecting member 653a to slide along the direction of the first rotational axis 601. The other end of the connecting member 653a is connected to a second linkage member 652a of the second adjusting assembly 652, and a hole 652e is formed in the second linkage member 652a. The connecting member 653a passes through the hole 652e and can be opposite to slide relative to the second linkage member 652a along the first rotational axis 60. The limiting member 653b is mounted on the connecting member 653a, and is located on the side of the second linkage member 652a away from the first adjusting assembly 651. In this way, when the connecting member 653a slides along the first rotational axis 601 toward the first adjusting assembly 651, the limiting member 653b pushes the second linkage member 652a to move with the connecting member 653a, so that the second linkage member 652a can rotate relative to the second connecting rod 622 and the second locking pin 652b is disengaged from the second fixing plate 642. When the connecting member 653a slides along the first rotational axis 601 toward the second adjusting assembly 652, the limiting member 653b no longer limits the second linkage member 652a, and the connecting member 653a no longer drives the second linkage member 652a to move. The second linkage member 652a is reset by the second elastic member 652c. That is to say, when the operating member 651c moves from the first position to the second position, the transmission assembly 653 transmits motion between the first adjusting assembly 651 and the second adjusting assembly 652. When the operating member 651c is moved from the second position to the first position, the transmission assembly 653 does not transmit motion between the first adjusting assembly 651 and the second adjusting assembly 652.

What is claimed is:

1. A hand-propelled power tool, comprising:
   a main body;
   a handle assembly comprising a gripping portion, a first connecting rod, and a second connecting rod, wherein the gripping portion comprises a first end and a second end, a first connecting rod connects the first end of the gripping portion and the main body, and the second connecting rod connects the second end of the gripping portion and the main body;
   a first adjusting assembly configured to lock or release a rotation of the first connecting rod relative to the main body, wherein at least a portion of the first adjusting assembly is mounted at the first connecting rod;
   a second adjusting assembly configured to lock or release the rotation of the second connecting rod relative to the main body, wherein at least a portion of the second adjusting assembly is mounted at the second connecting rod;
   an operating member movable to a first position and a second position, wherein the operating member drives the first adjusting assembly to release the rotation of the first connecting rod relative to the main body when the operating member moves from the first position to the second position; and
   a transmission assembly configured to connect the first adjusting assembly and the second adjusting assembly, wherein the transmission assembly drives the second adjusting assembly to release the rotation of the second connecting rod relative to the main body when the first adjusting assembly releases the rotation of the first connecting rod relative to the main body, and
   wherein in condition that the operating member moves from the first position to the second position, the transmission assembly is operative to transmit a motion between the first adjusting assembly and the second adjusting assembly, and, in condition that the operating member moves from the second position to the first position, the transmission assembly does not transmit motion between the first adjusting assembly and the second adjusting assembly.

2. The hand-propelled power tool of claim 1, wherein, in condition that the operating member moves from the first position to the second position, the transmission assembly is operative to transmit a force between the first adjusting assembly and the second adjusting assembly and, in condition that the operating member moves from the second position to the first position, the transmission assembly does not transmit a force between the first adjusting assembly and the second adjusting assembly.

3. The hand-propelled power tool of claim 1, wherein in condition that the first adjusting assembly moves to release the rotation of the first connecting rod relative to the main body, the transmission assembly transmits a motion from the first adjusting assembly to the second adjusting assembly; and, in condition that the first adjusting assembly moves to lock the rotation of the first connecting rod relative to the main body, the transmission assembly does not transmit a motion from the first adjusting assembly to the second adjusting assembly.

4. The hand-propelled power tool of claim 1, wherein the first adjusting assembly comprises a first locking pin configured to connect the first connecting rod and the main body to lock the rotation of the first connecting rod, the second adjusting assembly comprises a second locking pin configured to connect the second connecting rod and the main body to lock the rotation of the second connecting rod, and the main body comprises a first fixing plate provided with a first locking hole for the first locking pin to insert and a second fixing plate provide with a second locking hole for the second locking pin to insert.

5. The hand-propelled power tool of claim 1, wherein the first adjusting assembly comprises a first locking member configured to connect with the first connecting rod and the main body to lock the rotation of the first connecting rod and a first elastic member configured to drive the first locking member to reset to lock the rotation of the first connecting rod.

6. The hand-propelled power tool of claim 5, wherein the first elastic member biases the operating member to move to the first position.

7. The hand-propelled power tool of claim 5, wherein the second adjusting assembly comprises a second locking member configured to connect with the second connecting rod and the main body to lock the rotation of the second connecting rod and a second elastic member configured to drive second locking member to reset to lock the rotation of the second connecting rod.

8. The hand-propelled power tool of claim 7, wherein the first adjusting assembly further comprises a first linkage member connecting the first locking member and the transmission assembly, the first linkage member is rotatably connected to the first connecting rod, and the first linkage member connects the operating member and the first locking member.

9. The hand-propelled power tool of claim 8, wherein the first connecting rod is capable of rotating relative to the main body about a first rotational axis and the first linkage member is capable of rotating relative to the first connecting rod about a second axis perpendicular to the first rotational axis.

10. The hand-propelled power tool of claim 8, wherein the second adjusting assembly further comprises a second linkage member connecting the second locking member and the transmission assembly and the second linkage member is rotatably connected to the second connecting rod.

11. The hand-propelled power tool of claim 1, wherein the first adjusting assembly comprises a first locking member configured to connect with the first connecting rod and the main body to lock the rotation of the first connecting rod, a first linkage member connecting the first locking member and the transmission assembly, and the first linkage member connects the operating member and the first locking member.

12. The hand-propelled power tool of claim 11, wherein the second adjusting assembly comprises a second locking member configured to connect with the second connecting rod and the main body to lock the rotation of the second connecting rod, and a second linkage member connecting the second locking member and the transmission assembly.

13. The hand-propelled power tool of claim 11, wherein the first connecting rod is capable of rotating relative to the main body about a first rotational axis, and the first linkage member is capable of rotating relative to the first connecting rod about a second axis perpendicular to the first rotational axis, the operating member is disposed on a side of the second axis, and the first locking member and the transmission assembly are disposed on another side of the second axis.

14. The hand-propelled power tool of claim 1, wherein the handle assembly further comprises a pivot shaft connecting the first connecting rod and the second connecting rod, and the pivot shaft is connected to the main body.

15. A hand-propelled power tool, comprising:
a main body;
a handle assembly comprising a gripping portion, a first connecting rod and a second connecting rod, wherein the gripping portion comprises a first end and a second end, a first connecting rod connects the first end of the gripping portion and the main body, and the second connecting rod connects the second end of the gripping portion and the main body;
a first adjusting assembly configured to lock or release a rotation of the first connecting rod relative to the main body, wherein at least a portion of the first adjusting assembly is mounted at the first connecting rod;
a second adjusting assembly configured to lock or release the rotation of the second connecting rod relative to the main body, wherein at least a portion of the second adjusting assembly is mounted at the second connecting rod; and
an operating member movable to a first position and a second position,
wherein the first adjusting assembly releases the rotation of the first connecting rod relative to the main body and the second adjusting assembly releases the rotation of the second connecting rod relative to the main body when the operating member is operated to move to the second position, and
wherein in condition that the operating member moves from the first position to the second position, the transmission assembly is operative to transmit a motion between the first adjusting assembly and the second adjusting assembly, and, in condition that the operating member moves from the second position to the first position, the transmission assembly does not transmit motion between the first adjusting assembly and the second adjusting assembly.

16. A hand-propelled power tool, comprising:
a main body;
a handle assembly comprising a gripping portion, a first connecting rod and a second connecting rod, wherein the gripping portion comprises a first end and a second end, a first connecting rod connects the first end of the gripping portion and the main body, and the second connecting rod connects the second end of the gripping portion and the main body;
a first adjusting assembly configured to lock or release a rotation of the first connecting rod relative to the main body, wherein at least a portion of the first adjusting assembly is mounted at the first connecting rod;
a second adjusting assembly configured to lock or release the rotation of the second connecting rod relative to the main body, wherein at least a portion of the second adjusting assembly is mounted at the second connecting rod; and
an operating member movable to a first position and a second position,
wherein the operating member drives the first adjusting assembly to release the rotation of the first connecting rod relative to the main body and drives the second adjusting assembly to release the rotation of the second connecting rod relative to the main body when the operating member is operated to move to the second position, and
wherein in condition that the operating member moves from the first position to the second position, the transmission assembly is operative to transmit a motion between the first adjusting assembly and the second adjusting assembly, and, in condition that the operating member moves from the second position to the first position, the transmission assembly does not transmit motion between the first adjusting assembly and the second adjusting assembly.

17. The hand-propelled power tool of claim 16, further comprising a first transmission assembly configured to transmit a first mechanical movement between the operating member and the first adjusting assembly and a second transmission assembly configured to transmit a second mechanical movement between the operating member and the second adjusting assembly.

18. The hand-propelled power tool of claim 16, wherein the first adjusting assembly comprises a first locking pin configured to connect the first connecting rod and the main body to lock the rotation of the first connecting rod and the second adjusting assembly comprises a second locking pin configured to connect the second connecting rod and the main body to lock the rotation of the second connecting rod.

19. The hand-propelled power tool of claim 18, wherein the first adjusting assembly comprises a first elastic member configured to drive first locking member to reset to lock the rotation of the first connecting rod and the second adjusting assembly comprises a second elastic member configured to drive second locking member to reset to lock the rotation of the second connecting rod.

* * * * *